US008784182B2

(12) United States Patent
Okada

(10) Patent No.: US 8,784,182 B2
(45) Date of Patent: Jul. 22, 2014

(54) SLOT MACHINE AND PLAYING METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 390 days.

(21) Appl. No.: 13/184,803

(22) Filed: Jul. 18, 2011

(65) Prior Publication Data

US 2011/0269527 A1 Nov. 3, 2011

Related U.S. Application Data

(63) Continuation of application No. 11/797,430, filed on May 3, 2007, now abandoned.

(60) Provisional application No. 60/838,382, filed on Aug. 18, 2006.

(51) Int. Cl.
*A63F 13/00* (2014.01)
*G07F 17/32* (2006.01)
*G07F 17/34* (2006.01)

(52) U.S. Cl.
CPC ............ *G07F 17/3262* (2013.01); *G07F 17/32* (2013.01); *G07F 17/34* (2013.01); *G07F 17/3213* (2013.01); *G07F 17/3209* (2013.01); *G07F 17/3269* (2013.01); *G07F 17/3267* (2013.01)
USPC ............................................... 463/20; 463/16

(58) Field of Classification Search
CPC . G07F 17/32; G07F 17/3269; G07F 17/3213; G07F 17/3209; G07F 17/3262; G07F 17/3267; G07F 17/34
USPC ...................................................... 463/16, 20
See application file for complete search history.

(56) References Cited

U.S. PATENT DOCUMENTS

| | | | | |
|---|---|---|---|---|
| 3,759,525 | A * | 9/1973 | Davis | 273/143 R |
| 5,722,891 | A * | 3/1998 | Inoue | 463/20 |
| 6,012,983 | A * | 1/2000 | Walker et al. | 463/20 |
| 6,659,867 | B1 * | 12/2003 | Kodachi et al. | 463/20 |
| 6,702,670 | B2 * | 3/2004 | Jasper et al. | 463/20 |
| 6,824,466 | B1 * | 11/2004 | Hirota | 463/20 |
| 6,916,243 | B2 * | 7/2005 | Yoshida | 463/20 |
| 6,942,571 | B1 * | 9/2005 | McAllister et al. | 463/20 |
| 6,960,133 | B1 | 11/2005 | Marks et al. | |
| 7,300,351 | B2 * | 11/2007 | Thomas | 463/20 |
| 2001/0041611 | A1 * | 11/2001 | Sakamoto | 463/20 |
| 2002/0132660 | A1 * | 9/2002 | Taylor | 463/16 |
| 2002/0151339 | A1 * | 10/2002 | Huang | 463/12 |
| 2002/0155881 | A1 * | 10/2002 | Yoshida | 463/20 |

(Continued)

*Primary Examiner* — William H McCulloch, Jr.
(74) *Attorney, Agent, or Firm* — KMF Patent Services, PLLC; Kenneth M. Fagin, Esq.; S. Peter Konzel, Esq.

(57) ABSTRACT

A part of credits paid by the player is accumulated when a plurality of symbols are displayed by a scrolling display and then rearranged in a prescribed combination, and a stop switch is set active only in a case where a predetermined combination is determined. When a plurality of symbols are rearranged in a combination of jackpot symbols in relation to a timing of an input by a player, a payout of the accumulated credits is made. Consequently, the reels can be stopped by an operation of the player himself, and in a case where a combination of the stopped symbols is a combination associated with a payout, a payout can be received as a reward, so that the player's interest to the game can be increased.

21 Claims, 22 Drawing Sheets

(56) References Cited

U.S. PATENT DOCUMENTS

| | | | | |
|---|---|---|---|---|
| 2003/0069067 | A1* | 4/2003 | Okada | 463/20 |
| 2003/0232640 | A1* | 12/2003 | Walker et al. | 463/16 |
| 2004/0038726 | A1* | 2/2004 | Inoue | 463/20 |
| 2004/0063488 | A1* | 4/2004 | Berman | 463/18 |
| 2004/0102238 | A1* | 5/2004 | Taylor | 463/16 |
| 2004/0214637 | A1* | 10/2004 | Nonaka | 463/31 |
| 2004/0224752 | A1* | 11/2004 | Nireki et al. | 463/20 |
| 2004/0235551 | A1* | 11/2004 | Walker et al. | 463/16 |
| 2005/0029977 | A1* | 2/2005 | Nireki | 318/445 |
| 2005/0192083 | A1* | 9/2005 | Iwamoto | 463/20 |
| 2005/0245310 | A1* | 11/2005 | Amaitis et al. | 463/20 |
| 2006/0025207 | A1* | 2/2006 | Walker et al. | 463/25 |
| 2006/0068881 | A1* | 3/2006 | Casey | 463/20 |
| 2006/0135245 | A1* | 6/2006 | Hedrick et al. | 463/19 |
| 2006/0148554 | A1* | 7/2006 | Hornik et al. | 463/20 |
| 2006/0189377 | A1* | 8/2006 | Gomez et al. | 463/20 |
| 2007/0021179 | A1* | 1/2007 | Kobayashi | 463/16 |
| 2007/0021190 | A1* | 1/2007 | Kobayashi | 463/20 |
| 2007/0060295 | A1* | 3/2007 | DeMar et al. | 463/20 |
| 2007/0167223 | A1* | 7/2007 | Bleich et al. | 463/25 |
| 2007/0167235 | A1* | 7/2007 | Naicker | 463/42 |
| 2007/0287526 | A1* | 12/2007 | Sato | 463/20 |
| 2008/0026817 | A1* | 1/2008 | Okada | 463/20 |
| 2008/0026820 | A1* | 1/2008 | Okada | 463/20 |
| 2008/0045314 | A1* | 2/2008 | Okada | 463/20 |
| 2008/0051170 | A1* | 2/2008 | Okada | 463/17 |

* cited by examiner

FIG. 3

| | 28a | 28b | 28c | 28d | 28e |
|---|---|---|---|---|---|
| CODE NO. | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | LOBSTER | CHERRY | ORANGE | BELL | PLUM |
| 05 | PLUM | LOBSTER | PLUM | PLUM | BLUE 7 |
| 06 | ORANGE | PLUM | LOBSTER | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | LOBSTER | PLUM |
| 12 | ORANGE | PLUM | BELL | PLUM | CRAB |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CRAB | CHERRY |
| 17 | CRAB | STRAWBERRY | CRAB | BELL | LOBSTER |
| 18 | ORANGE | CRAB | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 4

| | 28a | 28b | 28c | 28d | 28e |
|---|---|---|---|---|---|
| CODE NO. | SYMBOL | SYMBOL | SYMBOL | SYMBOL | SYMBOL |
| 00 | APPLE | PLUM | APPLE | ORANGE | APPLE |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | LOBSTER | CHERRY | ORANGE | BELL | PLUM |
| 05 | PLUM | LOBSTER | PLUM | PLUM | BLUE 7 |
| 06 | ORANGE | PLUM | LOBSTER | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | LOBSTER | PLUM |
| 12 | ORANGE | PLUM | BELL | PLUM | CRAB |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CRAB | CHERRY |
| 17 | CRAB | STRAWBERRY | CRAB | BELL | LOBSTER |
| 18 | ORANGE | CRAB | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 5

| 28a | 28b | 28c | 28d | 28e | PAYOUT |
|---|---|---|---|---|---|
| JACKPOT 7 | JACKPOT 7 | JACKPOT 7 | JACKPOT 7 | JACKPOT 7 | JACKPOT PAY |
| APPLE | APPLE | APPLE | APPLE | APPLE | BONUS GAME |
| LOBSTER | LOBSTER | LOBSTER | LOBSTER | LOBSTER | STOP CONTROL GAME |
| CHERRY | CHERRY | CHERRY | CHERRY | CHERRY | 20 COINS |
| PLUM | PLUM | PLUM | PLUM | PLUM | 5 COINS |
| ... | ... | ... | ... | ... | ... |

SLOT MACHINE AND PLAYING METHOD THEREOF

CROSS-REFERENCE TO RELATED APPLICATIONS

This application is a continuation of U.S. application Ser. No. 11/797,430 (now abandoned) filed on May 3, 2007. That application was based upon and claimed the benefit of U.S. Provisional Application No. 60/838,382, filed on Aug. 18, 2006. The entire contents of both preceding applications are incorporated herein by reference.

BACKGROUND OF THE INVENTION

1. Field of the Invention

The present invention relates to a slot machine for playing games by using a game medium such as coin or bill, and a playing method thereof.

2. Description of Related Art

In the conventional slot machine such as those disclosed in U.S. Pat. No. 6,960,133B1 and U.S. Pat. No. 6,012,983, when a player inserts the game medium such as medal, coin or bill into an insertion slot of the slot machine and inputs a spin button, a plurality of symbols are displayed as a scrolling display at a display unit provided on a front side of a cabinet, and then each symbol is automatically stopped. At this point, a processing for determining symbols to be stopped is carried out at a time of starting the scrolling display of each symbol which is triggered by the input of the spin button. When a transition to a bonus game such as mystery bonus or second game is won by this processing for determining symbols to be stopped, a transition from the base game to the bonus game is made and the bonus game is executed.

Then, the slot machine is made to pay out a prize according to the winning state that occurs in the course of the game.

In such a conventional slot machine, the game comprises only the automatic stopping of the symbols displayed by the scrolling display, so that there are demands for new slot machines that are much more entertaining.

SUMMARY OF THE INVENTION

The first aspect of the present invention is a slot machine, comprising: a first display on which a symbol matrix formed by a plurality of columns and a plurality of rows is to be arranged; a stop switch that can be operated by a player; and a controller operable to: (a) execute an arrangement control in which a plurality of symbols arranged on the first display are displayed by a scrolling display and then rearranged into a new symbol matrix by selectively determining those symbols to be arranged into the symbol matrix from a plurality of types of symbols and stopping the scrolling display at determined symbols, and (b) execute a control for setting the stop switch active and providing a game that can be played by a player without betting for a prescribed number of times only in a case where at least one predetermined symbol or a predetermined combination formed by one or more symbols among the plurality of symbols is determined.

According to the slot machine of the first aspect of the present invention, when a plurality of symbols is rearranged into a prescribed combination by rearranging new symbols, the stop switch is set active and a game that can be played by a player without betting is provided for a prescribed number of times only in a case where at least one predetermined symbol or a predetermined combination formed by one or more symbols among the plurality of symbols is determined.

The second aspect of the present invention is a slot machine, comprising: a first display on which a symbol matrix formed by a plurality of columns and a plurality of rows is to be arranged; a stop switch that can be operated by a player; a memory for storing a part or a whole of credits paid to the player accumulatively; and a controller operable to: (a) execute an arrangement control in which a plurality of symbols arranged on the first display are displayed by a scrolling display and then rearranged into a new symbol matrix by selectively determining those symbols to be arranged into the symbol matrix from a plurality of types of symbols and stopping the scrolling display at determined symbols, (b) execute a control for setting the stop switch active and providing a game that can be played by a player without betting for a prescribed number of times only in a case where at least one predetermined symbol or a predetermined combination formed by one or more symbols among the plurality of symbols is determined, and (c) execute a control for returning the credits stored in the memory to the slot machine itself when the symbols are stopped at a specific combination as the stop switch is operated in the game that can be played by the player without betting.

According to the slot machine of the second aspect of the present invention, when a plurality of symbols is rearranged into a prescribed combination by rearranging new symbols, the stop switch is set active and a game that can be played by a player without betting is provided for a prescribed number of times only in a case where at least one predetermined symbol or a predetermined combination formed by one or more symbols among the plurality of symbols is determined, and further the credits stored in the memory are returned to the slot machine itself when the symbols are stopped at a specific combination in that game.

The third aspect of the present invention is a slot machine, comprising: a first display on which a symbol matrix formed by a plurality of columns and a plurality of rows is to be arranged; a stop switch that can be operated by a player; a memory for storing a part or a whole of credits paid to the player accumulatively; a second display on which at least one symbol is displayed by a scrolling display; and a controller operable to: (a) execute an arrangement control in which a plurality of symbols arranged on the first display are displayed by a scrolling display and then rearranged into a new symbol matrix by selectively determining those symbols to be arranged into the symbol matrix from a plurality of types of symbols and stopping the scrolling display at determined symbols, (b) execute a control for setting the stop switch active and executing a game for stopping a plurality of symbols arranged on the second display after the scrolling display only in a case where at least one predetermined symbol or a predetermined combination formed by one or more symbols among the plurality of symbols is determined on the first display and providing a game that can be played by the player without betting for a prescribed number of times when specific symbols are stopped as the stop switch is operated in that game, and (c) execute a control for returning the credits stored in the memory to the slot machine itself when the symbols are stopped at a specific combination as the stop switch is operated in the game that can be played by the player without betting.

According to the slot machine of the third aspect of the present invention, when a plurality of symbols is rearranged into a prescribed combination by rearranging new symbols, the stop switch is set active and a game for stopping a plurality of symbols on the second display after the scrolling display is executed only in a case where at least one predetermined symbol or a predetermined combination formed by one or more more symbols among the plurality of symbols is determined, and when specific symbols are stopped in that game, a game that can be played by a player without betting is provided for a prescribed number of times, and further the credits stored in the memory are returned to the slot machine itself when the symbols are stopped at a specific combination in that game.

The fourth aspect of the present invention is a playing method of a slot machine, comprising the steps of: (a) selectively determining those symbols to be arranged into a symbol matrix from a plurality of types of symbols and stopping a scrolling display at determined symbols by a controller, in order to display a plurality of symbols to be arranged in a symbol matrix by a scrolling display and then rearrange them into a new symbol matrix, on a first display on which a symbol matrix formed by a plurality of columns and a plurality of rows is to be arranged; and (b) setting a stop switch active such that it can be operated by a player and providing a game that can be played by the player without betting for a prescribed number of times only in a case where at least one predetermined symbol or a predetermined combination formed by one or more symbols among the plurality of symbols is determined.

In the playing method using a slot machine of the fourth aspect of the present invention, when selectively determining those symbols to be arranged into a symbol matrix from a plurality of types of symbols in order to display a plurality of symbols by a scrolling display and then rearrange them into anew symbol matrix, on a first display on which a symbol matrix formed by a plurality of columns and a plurality of rows is to be arranged, a stop switch is set active such that it can be operated by a player and a game that can be played by the player without betting is provided for a prescribed number of times only in a case where at least one predetermined symbol or a predetermined combination formed by one or more symbols among the plurality of symbols is determined.

The fifth aspect of the present invention is a playing method of a slot machine, comprising the steps of: (a) selectively determining those symbols to be arranged into a symbol matrix from a plurality of types of symbols and stopping a scrolling display at determined symbols by a controller, in order to display a plurality of symbols to be arranged in a symbol matrix by a scrolling display and then rearrange them into a new symbol matrix, on a first display on which a symbol matrix formed by a plurality of columns and a plurality of rows is to be arranged; (b) setting a stop switch active such that it can be operated by a player and providing a game that can be played by the player without betting for a prescribed number of times only in a case where at least one predetermined symbol or a predetermined combination formed by one or more symbols among the plurality of symbols is determined; and (c) returning credits obtained by accumulating a part or a whole of credits to be paid to a player that are stored in a memory to the slot machine itself when the symbols are stopped at a specific combination as the stop switch is operated in the game that can be played by the player without betting.

In the playing method using a slot machine of the fifth aspect of the present invention, when selectively determining those symbols to be arranged into a symbol matrix from a plurality of types of symbols in order to display a plurality of symbols by a scrolling display and then rearrange them into a new symbol matrix, on a first display on which a symbol matrix formed by a plurality of columns and a plurality of rows is to be arranged, a stop switch is set active such that it can be operated by a player and a game that can be played by the player without betting is provided for a prescribed number of times only in a case where at least one predetermined symbol or a predetermined combination formed by one or more symbols among the plurality of symbols is determined, and a part or a whole of the credits to be paid to the player that are stored in the memory are returned to the slot machine itself when the symbols are stopped at a specific combination in the game that can be played by the player without betting.

The sixth aspect of the present invention is a playing method of a slot machine, comprising the steps of: (a) selectively determining those symbols to be arranged into a symbol matrix from a plurality of types of symbols and stopping a scrolling display at determined symbols by a controller, in order to display a plurality of symbols to be arranged in a symbol matrix by a scrolling display and then rearrange them into a new symbol matrix, on a first display on which a symbol matrix formed by a plurality of columns and a plurality of rows is to be arranged; (b) setting a stop switch active such that it can be operated by a player and executing a game for stopping a plurality of symbols arranged on a second display after a scrolling display only in a case where at least one predetermined symbol or a predetermined combination formed by one or more symbols among the plurality of symbols is determined; (c) providing the game that can be played by the player without betting for a prescribed number of times when specific symbols are stopped as the stop switch is operated in that game; and (d) returning credits obtained by accumulating a part or a whole of credits to be paid to a player that are stored in a memory to the slot machine itself when the symbols are stopped at a specific combination as the stop switch is operated in the game that can be played by the player without betting.

In the playing method using a slot machine of the sixth aspect of the present invention, when selectively determining those symbols to be arranged into a symbol matrix from a plurality of types of symbols in order to display a plurality of symbols by a scrolling display and then rearrange them into a new symbol matrix, on a first display on which a symbol matrix formed by a plurality of columns and a plurality of rows is to be arranged, a stop switch is set active such that it can be operated by a player and a game for stopping a plurality of symbols arranged on a second display after a scrolling display is executed only in a case where at least one predetermined symbol or a predetermined combination formed by one or more symbols among the plurality of symbols is determined, and when the player succeeds in stopping specific symbols in that game, a game that can be played by the player without betting is provided for a prescribed number of times, and when the symbols are stopped at a specific combination in that game, a part or a whole of the credits to be paid to the player that are stored in the memory are returned to the slot machine itself.

BRIEF DESCRIPTION OF THE DRAWINGS

FIG. 3 is a diagram showing symbols displayed in each display region of a slot machine according to one embodiment of the present invention and a code number of each symbol.

FIG. 4 is a diagram showing another example of symbols displayed in each display region of a slot machine according to one embodiment of the present invention and a code number of each symbol.

FIG. 5 is a diagram showing a payout table indicating a relationship between a winning combination and a payout amount.

DETAILED DESCRIPTION OF THE EMBODIMENT

Figure 1:
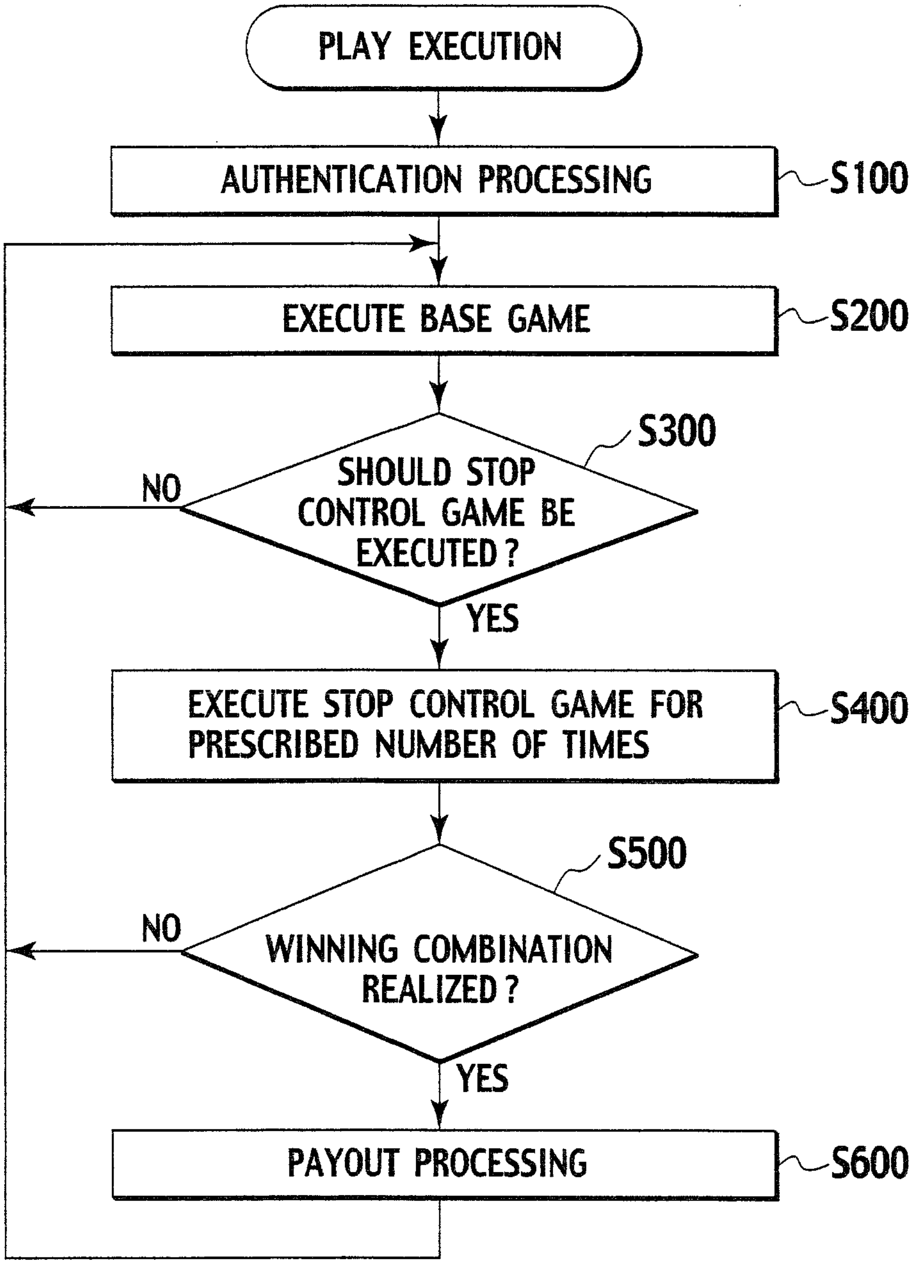
FIG. 1 is a flow chart showing a playing method of a slot machine according to one embodiment of the present invention.

FIG. 1 is a flow chart schematically showing a playing method of a slot machine according to one embodiment of the present invention. In the following, the schematic operations in the slot machine and the playing method according to one embodiment of the present invention will be described with references to the flow chart shown in FIG. 1 and a diagram shown in FIG. 2.

In the slot machine according to one embodiment of the present invention, when the power is turned on and the slot machine is activated, an authentication processing is carried out first (step S100). In this authentication processing, the initial checking processing at a preliminary stage before starting a unit game, such as whether a program for operating the system is operating normally or not, whether there is any alteration of a program or not, etc., is carried out.

Next, a base game is executed (step S200). In this base game, when a spin button 23 is pressed in a state where a desired credit amount is bet by entering coins into a coin slot 21 or the like, a unit game in which the scrolling of a symbol in each display region 28 of a liquid crystal display 17 provided inside display windows 15 (15*a* to 15*e*) of three rows by five columns which are provided on a front face of a cabinet 11 is started and then the scrolling is stopped and the symbol in each of the 15 display regions 28 (28*a*-X to 28*e*-Z) of three rows by five columns is stopped (rearranged) is executed. Note that suffixes "a, b, c, d, e" indicate the columns, and suffixes "X, Y, Z" indicate the rows.

In each unit game, a processing for determining a symbol to be stopped in each display region 28 (28*a* to 28*e*) is carried out, and when a combination of symbols to become a bonus trigger are stopped on a payline L that is set at a middle level of each display region 28, such as when symbols "APPLE" are stopped on the payline L, for example, a transition to a bonus game is made. Then, the slot machine 10 accumulates a part of credits to be paid to the player as credits for jackpot, according to a combination of symbols stopped in display regions 28 (28*a* to 28*e*) in each unit game.

Figure 14:
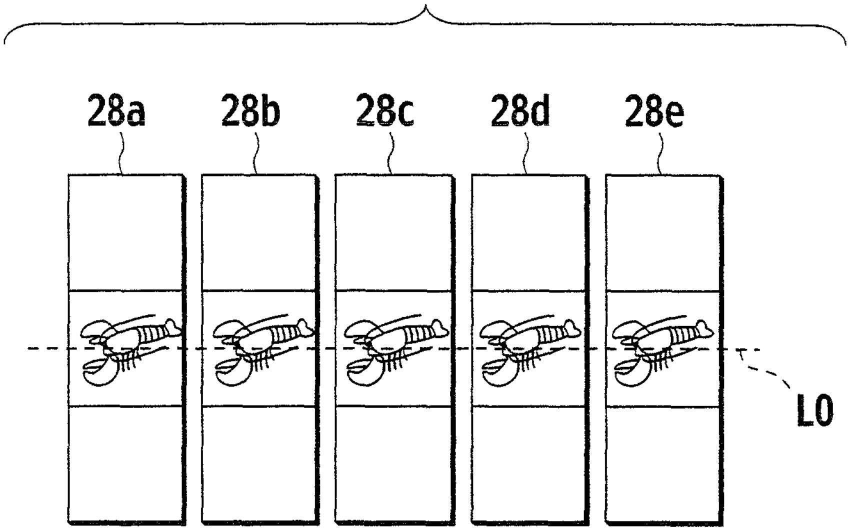
FIG. 14 is a diagram showing an exemplary display when a combination of "LOBSTER" that is a trigger for the stop control game is stopped on a payline L0 of a display region in a slot machine according to one embodiment of the present invention.

Also, when a prescribed condition is realized as in a case where a combination of prescribed symbols, such as symbols "LOBSTER" for example, is stopped in the display regions 28 (see FIG. 14), the input at a stop switch 82 is set active. Then, it becomes possible to execute a stop control game in which the scrolling symbols can be stopped when the stop switch 82 is pressed by the player, for a prescribed number of times (steps S300, S400).

When the stop control game is started, the scrolling of symbols in the display regions 28 (28*a* to 28*e*) is restarted, and the scrolling symbols are stopped when the stop switch 82 that is set active is pressed by the player. At this point, depending on whether a combination of specific symbols are stopped on the payline L that is set as a horizontal line at a middle level of the display regions 28 (28*a* to 28*e*) of five columns or not (step S500), a payout processing is carried out to make a payout by selecting a payout according to a combination at a time of stopping from a plurality of payout tables that are set up in advance (step S600).

For example, when symbols "CRAB" are stopped in a specific combination, a payout according to the stopped combination is selected from a plurality of payout tables that are set up in advance, and a payout is made. Namely, in the stop control game to be executed by the processing of the step S400 to the step S500, a payout is made according to the payout table determined by the step S500 in the case where the player succeeds in stopping a plurality of symbols in a specific combination associated with a payout (hereafter referred to as a winning combination) on the payline L by pressing the stop switch 82. The winning combinations include a jackpot combination for enabling a jackpot payout. For example, in the payout table shown in FIG. 4, the jackpot payout will be made with respect to stopping of a combination of symbols "JACKPOT7" as jackpot symbols on the payline L. The jackpot payout will be described in further detail below.

In the stop control game to be executed by the processing of the step S400 to the step S500, when the player succeeds in realizing a combination associated with a payout by pressing the stop switch 82 that is set active, the player can receive a prize for that combination. More specifically, when a rearrangement of scrolling symbols is made in relation to a timing of input of the stop switch 82 by the player, if the player succeeds in rearranging a plurality of symbols in a combination of jackpot symbols, a part or a whole of accumulated credits will be paid and the player can receive that payment.

In the above described example, an exemplary case of stopping and displaying symbols in the 15 display regions 28 (28*a*-X to 28*e*-Z) of three rows by five columns has been described, but the present invention is not limited to the display regions 28 of three rows by five columns. Moreover, an exemplary case of displaying symbols in the display regions 28 by using the liquid crystal display 18 has been described, but it is also possible to use a configuration using mechanical rotation reels in cylindrical shapes having a plurality of symbols displayed on their side faces, in which the rotation reels are rotated and then stopped such that the symbols are stopped inside the display windows 15 (15*a* to 15*e*).

Also, in the above described example, an exemplary case in which the symbols are displayed by the scrolling display in the vertical direction with respect to the display regions 28 (28*a* to 28*e*) and then symbols are stopped (rearranged) in the base game has been described, but it is also possible to display (rearrange) symbols by changing symbols in the display regions 28 (28*a* to 28*e*).

Also, in the above described example, when the stop control game is started, the symbols for the stop control game can be displayed by the scrolling display in the vertical direction or the horizontal direction in the display regions 28 provided inside the display windows 15 (15*a* to 15*e*), for example, and symbols can be stopped by operating the stop switch 82. Besides that, it is also possible to make it such that rotatable mechanical reels are provided on side portions of the display regions 28, symbols are scrolled by rotating these reels, and the scrolling of the reels is stopped when the stop switch 82 is pressed by the player. Then, when the player succeeds in stopping prescribed symbols displayed by the reels, the stop control game will be started. This example will be described in further detail below with references to the drawings.

Moreover, in the above described example, an exemplary case in which symbols are displayed by the scrolling display in the vertical direction as if one row is a series or reels with respect to the 15 display regions 28 and then symbols are stopped (rearranged) in the base game, but it is also possible to display (rearrange) symbols by changing a symbol in each one of the 15 display regions 28 (28*a*-X to 28*e*-Z).

Next, a configuration of the slot machine 10 according to one embodiment of the present invention will be described with reference to a diagram shown in FIG. 2. This slot machine 10 is provided within a gaming facility.

In the slot machine 10, the coins, bills or electronic value information corresponding to these will be used as the game medium for executing the unit game. However, the game medium that can be used in the present invention is not limited to these, and can be medals, tokens, electronic money, or tickets, for example. The tickets are not limited to any particular tickets and can be tickets with bar codes, for example, as will be described below.

Figure 2:
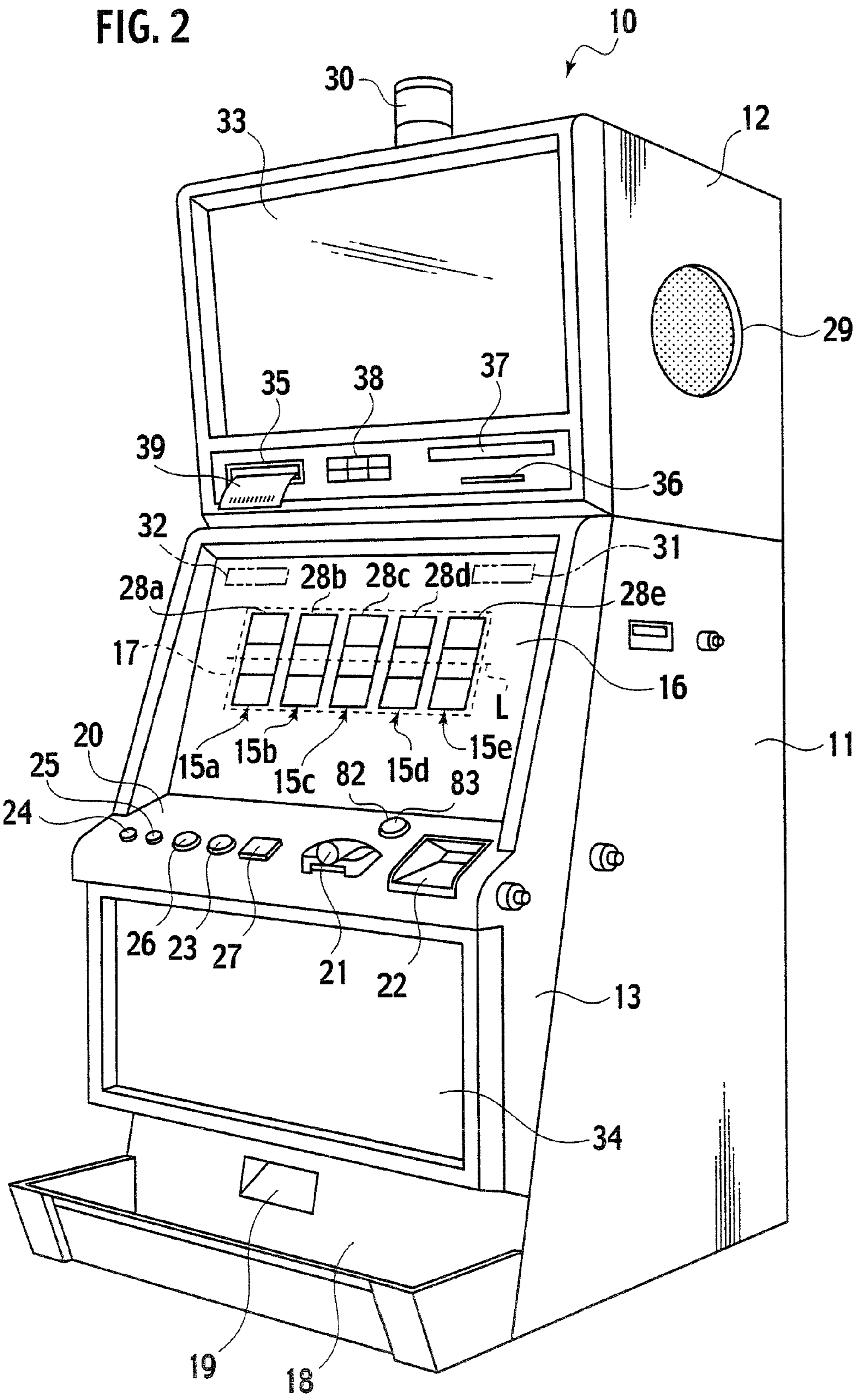
FIG. 2 is a diagram showing an outward appearance of a slot machine according to one embodiment of the present invention.

As shown in FIG. 2, the slot machine 10 has a cabinet 11, a top box 12 provided on an upper side of the cabinet 11, and a main door 13 provided on a front side of the cabinet 11.

Inside the cabinet 11, a liquid crystal display 17 for scrolling symbols inside the display windows 15 (15*a* to 15*e*) of three rows by five columns is provided, and the liquid crystal display 17 has the display regions 28 (28*a* to 28*e*) for displaying symbols of three rows by five columns. Namely, when the base game is executed, the symbols are scrolled in the display regions 28 (28*a* to 28*e*) of three rows by five columns, such that it becomes possible for the player to see the scrolled symbols through the display windows 15 (15*a* to 15*e*).

Note that, in this embodiment, an exemplary case of using the display regions 28 (28*a* to 28*e*) of three rows by five columns of the liquid crystal display 17 as a display is described, but it is also possible to display symbols through the display windows 15 by rotating and then stopping mechanical reels displaying symbols on their side faces. Also, the display regions 28 are not limited to be those of three rows by five columns.

Also, on a lower side of the liquid crystal display 17 inside the cabinet 11, a stop switch 82 for stopping the scrolling symbols when the stop control game is started is provided. When the stop switch 82 is pressed by the player, the symbols will be stopped at a timing where this stop switch 82 is pressed.

Also, when the stop control game is started, a display lamp 83 provided at the stop switch 82 is turned on. In this way, it is notified to the player that symbols scrolled in the display regions 28 can be stopped by pressing the stop switch 82.

On a front side of the liquid crystal display 17 in the main door 13, a lower side image display panel 16 is provided. The lower side image display panel 16 has a transparent liquid crystal panel, on which various information regarding the game and the effect images will be displayed during the game.

On the lower side image display panel 16, a credit amount display unit 31 and a payout amount display unit 32 are provided. On the credit amount display unit 31, the number of coins credited is displayed by an image. On the payout amount display unit 32, the number of coins to be paid in the case where a combination of symbols that are stopped on the payline L is the winning combination as will be described below is displayed by an image.

On the lower side image display panel 16, five columns of the display windows 15 (15*a* to 15*e*) through which symbols displayed in the display regions 28 (28*a* to 28*e*) of the liquid crystal display 17 provided inside of it are visible are provided. Also, at a middle level of five columns of the display windows 15 (15*a* to 15*e*), a single payline L is set horizontally across these display windows 15 (15*a* to 15*e*). The payline L defines a combination of symbols. In the case where a combination of symbols that are stopped on the payline L is the winning combination, the number of coins according to that winning combination and the number of coins entered (BET number) will be paid.

As shown in FIG. 3, the lower side image display panel 16 displays a series of symbols shown in FIG. 3 (or FIG. 4) in the display windows 15 (15*a* to 15*e*). Each series of symbols is formed by 22 symbols, and a symbol constituting each series of symbols is assigned with a code number of any one of 0 to 21. In the lower side image display panel 16, after symbols are displayed by the scrolling display in the display regions 28 (28*a* to 28*e*), symbols are stopped at each one of the upper level (28*a*-X), the middle level (28*a*-Y), and the lower level (28*a*-Z) of the display regions 28 (28*a* to 28*e*). Namely, the lower side image display panel 16 corresponds to the first display capable of displaying a symbol matrix formed by a plurality of rows and a plurality of columns.

For example, in the lower side image display panel 16, symbols are displayed by the scrolling display in the display window 15*a*, a symbol "ORANGE" (code number: 06 in FIG. 3) is stopped at the upper level 28*a*-X of the display region 28*a*, a symbol "PLUM" (code number: 07 in FIG. 3) is stopped at the middle level 28*a*-Y of the display region 28*a*, and a symbol "BLUE7" (code number: 08 in FIG. 3) is stopped at the lower level 28*a*-Z of the display region 28*a*.

Note that, in this embodiment, an exemplary case of setting one payline L will be described, but it is possible to make it such that three paylines that run horizontally across the five display windows 15 (15*a* to 15*e*) at upper, middle and lower levels, or a payline that runs obliquely (V-shaped, inverted V-shaped, etc.) may be formed, such that as many paylines as the number according to the number of coins entered are set active, and if a combination of symbols that are stopped on the payline that is set active is the winning combination, the payout of as many coins as according to that combination may be made.

On a front face of the lower side image display panel 16, a touch panel 69 (see FIG. 6) is provided, such that the player can input various types of commands by operating the touch panel 69.

On a lower side of the lower side image display panel 16, a control panel 20 having a plurality of buttons 23-27 through which commands regarding the progress of the game will be inputted by the player, the stop switch 82, the coin slot 21 for receiving coins into the cabinet 11, and a bill validator 22 are provided.

Also, in this embodiment, an exemplary case of stopping scrolled symbols by using the stop switch 82 is described, but it is also possible to arrange a transparent touch panel on a front side of the display windows 15 instead of a mechanical stop switch 82 such that this touch panel can be used instead of the stop switch 82. Such a touch panel can be a touch panel adopted in the mobile terminal or the ATM of the bank. By arranging the touch panel as the stop switch 82 on a front side of the display windows 15 in this way, it becomes possible for the player to give a command for rearrangement by touching symbols that are desired to be stopped (rearranged) through the display windows 15, while watching the changing state of symbols of the display regions 28 through the display windows 15. Such a rearrangement operation has an advantage in that it can be done with a sense of directly touching symbols.

On the control panel 20, a spin button 23, a change button 24, a cashout button 25, a 1-BET button 26, and a Max-BET button 27 are provided. The spin button 23 is a button for inputting a command for start scrolling symbols displayed in the display regions 28. The change button 24 is a button to be used at a time of requesting changes to an attendant of the gaming facility. The cashout button 25 is a button for inputting a command for paying the credited coins to a coin tray 18.

The 1-BET button 26 is a button for inputting a command for betting one coin among the credited coins to the game. The Max-BET button 27 is a button for inputting a command for betting maximum number (50, for example) of coins that can be bet per game among the credited coins to the game.

The stop switch 82 is a switch for the player to carry out the operation to stop scrolling symbols, which is set active when the stop control game is started. Also, at the stop switch 82, a display lamp 83 is provided, and as will be described below, the display lamp 83 is turned on to notify to the the player that the operation of the stop switch 82 is active when the operation of the stop switch 82 is set active. Note that, instead of the stop switch 82, it is possible to use an operation lever, a track ball, a touch panel, etc.

The bill validator 22 validates whether a bill is the legitimate one or not and accepts a legitimate bill into the cabinet 11. The bill validator 22 may have a configuration capable of reading a bar code attached ticket 39 to be described below. On the lower front surface of the main door 13, that is on the lower part of the control panel 20, there is provided a berry glass 34 on which characters of the slot machine 10 and the like are depicted.

On a front surface of the top box 12, an upper side image display panel 33 is provided. The upper side image display panel 33 has a liquid crystal panel, and on this liquid crystal panel, the effect image or the image for introducing the game content or explaining game rules, for example, will be displayed.

Also, on the top box 12, a speaker 29 for outputting speech is provided. On the lower side of the upper side image display panel 33, a ticket printer 35, a card reader 36, a data display 37, and a key pad 38 are provided.

The ticket printer 35 prints a bar code which encodes data such as the total credit amount, the credit amount for jackpot, the date and time, the identification number of the slot machine 10, etc., on the ticket, and outputs it as the bar code attached ticket 39. The player can use the bar code attached ticket 39 to play the game on another slot machine or exchange the bar code attached ticket 39 with the bills or the like at the cashier or the like of the gaming facility.

The card reader 36 carries out reading of data from a smart card and writing of data into a smart card. The smart card is a card to be owned by the player, which stores data for identifying the player or data regarding log of games played by the player, for example.

The data display 37 comprises a fluorescent display or the like, and displays data read by the card reader 36, or data inputted by the player through the key pad 38, for example. The key pad 38 inputs data and commands regarding the ticket issuance or the like.

FIG. 3 is a diagram showing one example of a series of symbols (symbol series A) to be scrolled in the display regions 28 (28*a* to 28*e*) of the liquid crystal display 17 provided inside the cabinet 11. As shown in FIG. 3, in each of the display regions 28 (28*a* to 28*e*), a series of 22 symbols comprising the code numbers "00" to "21" will be scrolled. The series of symbols is different in different ones of the display regions 28 (28*a* to 28*e*).

The symbols to be displayed in each of the display regions 28 (28*a* to 28*e*) are formed by a combination of symbols "JACKPOT 7", "BLUE 7", "BELL", "CHERRY", "STRAWBERRY", "PLUM", "ORANGE", "APPLE", "LOBSTER" and "CRAB". Then, the winning combination associated with a payout is set up by a combination of the above described symbols. As a table for determining the payout amount when this winning combination is realized, a payout table shown in FIG. 5 is set up.

FIG. 4 is a diagram showing another example of a series of symbols (symbol series B) to be scrolled in the display regions 28 (28*a* to 28*e*). In the example shown in FIG. 4, a series of 22 symbols comprising the code numbers "00" to "21" will be scrolled and the series of symbols is different in different ones of the display regions 28 (28*a* to 28*e*) similarly as above, but the symbol "JACKPOT 7" is not contained in the display regions 28 (28*a* to 28*e*). When symbols are scrolled in the display regions 28 of the liquid crystal display 17, a combination associated with a payout is selected and set up from the series of symbols of FIG. 4 in the case of not making a jackpot payout, as will be described below. As a table for determining a payout when a winning combination is realized, the payout table shown in FIG. 5 can be used similarly.

FIG. 5 is a diagram showing the payout table. This payout table is referred in the case of executing the ordinary base game or the case of making a payout with respect to a combination that the player succeeded in stopping and displaying in the stop control game. As shown in FIG. 5, in the case where a combination of symbols "JACKPOT 7" is aligned and stopped on the payline L in the five display regions 28 (28*a* to 28*e*), the jackpot payout is provided. Also, in the case where a combination of symbols "APPLE" is stopped on the payline L in the five display regions 28 (28*a* to 28*e*), the bonus game is provided. Namely, a combination in which symbols "APPLE" are aligned is a bonus trigger, and a transition of the game mode from the base game to the bonus game is made when this combination is realized.

Also, in the case where a combination of symbols "LOBSTER" is stopped on the payline L, the stop control game is executed. In the case where a combination of symbols "CHERRY" is stopped on the payline L, the payout of 20 coins is made. In the case where a combination of symbols "PLUM" is stopped on the payline L, the payout of 5 coins is made.

The stop control game to be executed when a combination of symbols "LOBSTER" is stopped on the payline L is a free game (a game that can be played for a prescribed number of times without betting any coins) in this embodiment.

Note that, in the present invention, the bonus game is not particularly limited as long as it is more advantageous game mode for the player. Also, the bonus game that is more advantageous to the player is not particularly limited as long as it is more advantageous than the base game, and for example, it is possible to consider a mode in which more numerous gaming medium than the base game can be obtained, a mode in which the gaming medium can be obtained at a higher probability than the base game, a mode in which the amount of gaming medium to be consumed is less than the base game, etc. More specifically, a free game, a second game, etc. can be considered as the bonus game.

The symbols displayed (arranged) in the 15 display regions 28 (28*a*-X to 28*e*-Z) are started to be scrolled when the 1-BET button 26 or the Max-BET button 27 is pressed and then the spin button 23 is pressed after that. When the scrolling of the symbols is started, the scrolling of the symbols will be stopped (rearranged) after a prescribed period of time has elapsed. At this point, some of the symbols among the series of symbols in the display regions 28 shown in FIG. 3 will be stopped in the display regions 28 (28*a*-X to 28*e*-Z) inside the display windows 15 (15*a* to 15*e*).

In addition, various types of winning combinations are predetermined for each symbol (see FIG. 4), and in the case where the symbols that constitute the winning combination are stopped on the payline that is set active, the amount of coins to be paid according to the winning combination will be added to the credit owned by the player. Also, when the bonus game trigger is realized, that is, when a combination of five symbols "APPLE" is stopped on the payline that is set active in this embodiment, a transition of the game mode from the base game to the bonus game will be made.

Moreover, various types of winning combinations formed by a plurality of symbols (such as five "JACKPOT 7" symbols, for example) and the amount of coins to be paid according to each winning combination are predetermined, and in the base game, the payout amount of coins according to the winning combination is added to the total amount of credits in the case where symbols constituting the winning combination are stopped on the payline L.

Figure 6:
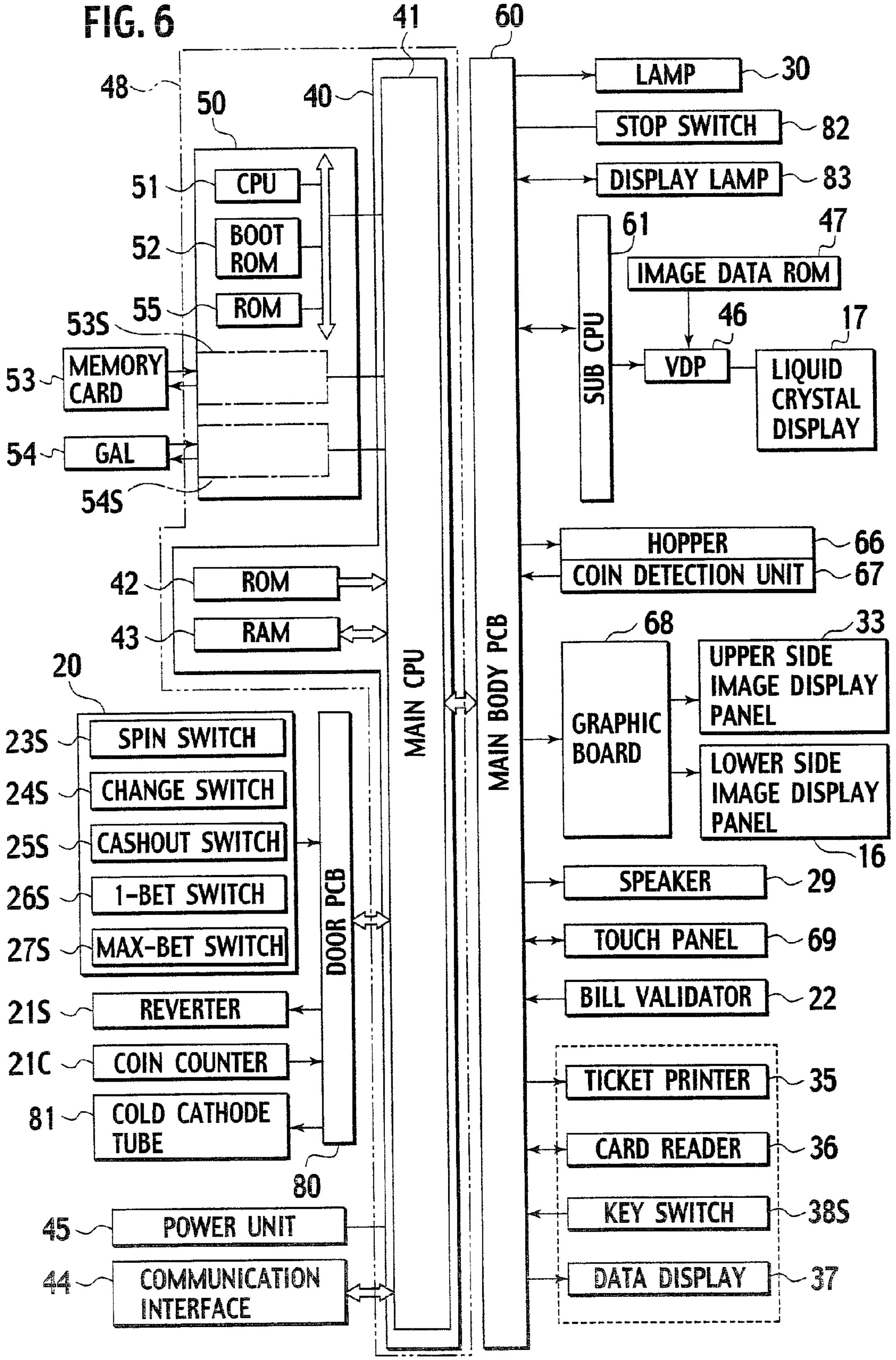
FIG. 6 is a block diagram showing a control circuit of a slot machine according to one embodiment of the present invention.

FIG. 6 is a block diagram showing a control circuit of the slot machine 10 shown in FIG. 2. As shown in FIG. 6, the control circuit comprises a controller 48, a main body PCB (Printed Circuit Board) 60, a sub CPU 61, a door PCB 80, and various types of switches and sensors. The controller 48 comprises a mother board 40 and a gaming board 50.

The gaming board 50 has a CPU (Central Processing Unit) 51, a ROM 55 and a boot ROM 52 which are mutually connected through an internal bus, a card slot 53S corresponding to a memory card 53, and an IC socket 54S corresponding to a GAL (Generic Array Logic) 54.

The memory card 53 stores a game program and a game system program. The game program includes a symbols to be stopped determination program. The symbols to be stopped determination program is a program for determining symbols (code numbers corresponding to symbols) to be stopped on the payline L in the display regions 28 (28*a* to 28*e*). This symbols to be stopped determination program contains symbol weighing data respectively corresponding to plural types of payout rates (80%, 84%, 88%, for example). The symbol weighing data are data indicating the correspondence relationship between the code number of each symbol (see FIG. 3 and FIG. 4), and one or a plurality of random number values belonging to a prescribed numerical value range (0 to 256), for each of the five columns of the display regions 28 (28*a* to 28*e*).

The payout rate is determined according to the payout rate setting data outputted from the GAL 54. The symbols to be stopped are determined according to the symbol weighing data corresponding to this payout rate.

Also, the card slot 53S is formed such that the memory card 53 can be inserted or extracted, and connected to the mother board 40 through the IDE bus. Consequently, by extracting the memory card 53 from the card slot 53S, writing the other game program and game system program into the memory card 53, and inserting that memory card 53 into the card slot 53S, it is possible to change a type and a content of the game to be played on the slot machine 10.

The game program includes a program related to the game progress and a program for making a transition to the bonus game. The game program also contains the image data and sound data to be outputted during the game. In addition, the game program contains the image data and sound data as the notification data for notifying to the player that the symbols stopping operation by the stop switch 82 during the scrolling is possible when the stop control game is started by a procedure to be described below.

The GAL 54 has a plurality of input ports and output ports, and when data are inputted into the input ports, data corresponding to these data are outputted from the output ports. The data outputted from the output ports are the payout rate setting data mentioned above.

Also, the IC socket 54S is formed such that the GAL 54 can be attached or detached, and connected to the mother board 40 through the PCI bus. Consequently, by detaching the GAL 54 from the IC socket 54S, rewriting the program stored in the GAL 54, and attaching that GAL 54 to the IC socket 54S, it is possible to change the payout rate setting data to be outputted from the GAL 54.

The CPU 51, the ROM 55 and the boot ROM 52 that are mutually connected through the internal bus are connected to the mother board 40 through the PCI bus. The PCI bus carries out the signal transmission between the mother board 40 and the gaming board 509, as well as the power supply from the mother board 40 to the gaming board 50. The ROM 55 stores a country identification information and an authentication program. The boot ROM 52 stores a spare authentication program and a program (boot codes) for the CPU 51 to activate the spare authentication program.

The authentication program is a program (alteration checking program) for authenticating the game program and the game system program. Namely, the authentication program is a program for carrying out the checking and the verification of the fact that the game program and the game system program are not altered. The authentication program is described along a procedure for carrying the authentication of the game program and the game system program. The spare authentication program is a program for authenticating the above described authentication program. The spare authentication program is described along a procedure for carrying out the verification that the authentication program that is a target of the authentication processing is not altered, that is, the authentication of the authentication program.

The mother board 40 has a main CPU 41, a ROM (Read Only Memory) 42, a RAM (Random Access Memory) 43, and a communication interface 44.

The main CPU 41 has a function of a controller for controlling the slot machine 10 overall. In particular, the main CPU 41 carries out a control for outputting a command signal to make the sub CPU 61 to scroll symbols in the display regions 28 (28*a* to 28*e*) of the liquid crystal display 17 when the credit is bet and the spin button 23 is pressed, a control for determining symbols to be stopped at a middle level position (on the payline L) after the symbols in the display regions 28 (28*a* to 28*e*) are scrolled, and a control for displaying symbols such that the determined symbols are stopped on the payline L.

Namely, the main CPU 41 carries out an arrangement control in which a plurality of symbols displayed on the display (liquid crystal display 17) are scrolled, and then symbols to be arranged into a symbol matrix are selected and determined from a plurality of types of symbols in order to rearrange them as a new symbol matrix, and the scrolling state is stopped at the determined symbols.

Also, the main CPU 41 sets the stop switch 82 active in a next unit game when a combination of prescribed symbols (symbols "LOBSTER" for example) is rearranged on the payline L that is set with respect to the symbol matrix, and executes the stop control game for enabling the rearrangement regardless of the arrangement control of the symbols scrolled in the display regions 28, in relation to an input timing of the stop switch 82 by the player.

Also, the main CPU 41 stores a part of the credits to be paid to the player at the slot machine 10 accumulatively as the credits for jackpot, and determines whether to make the payout of the credits for jackpot accumulatively stored or not at a time of executing the stop control game when the credit amount becomes greater than or equal to a prescribed jackpot threshold ("500" for example). The main CPU 41 makes the payout of the credits for jackpot when a winning combination of symbols associated with the jackpot payout (more specifically, five "JACKPOT 7") is realized on the payline L at the input timing of the stop switch 82 by the player.

In the stand-alone type slot machine such as the slot machine 10, the credits for jackpot are stored in the RAM 43. In contrast, in the case where it is a slot machine corresponding to the progressive system in which a plurality of slot machines are connected with a management server, a part of credits paid to the player at each slot machine will be stored at the management server, and a payout of credits is made from the management server to a slot machine that satisfied a prescribed condition. The progressive system will be described below (see FIG. 22 and FIG. 23).

The main CPU 41 outputs the scrolling command signal for displaying symbols by the scrolling display in the display regions 28 (28*a* to 28*e*), to a graphic board 68, in either one of the stop control game execution processing and the base game execution processing. The graphic board 68 controls the lower side image display panel 16 according to the scrolling command signal. The lower side image display panel 16 displays symbols by the scrolling display in the display regions 28 (28*a* to 28*e*) according to the control by the graphic board (or in other words a control by the main CPU 41).

In the base game execution processing, the main CPU 41 determines all the symbols to be stopped on the payline L, and outputs all stopping command signal regarding the determined symbols to the graphic board 68. The graphic board 68 controls the lower side image display panel 16 according to the all stopping command signal. The lower side image display panel 16s stops the symbols indicated by the all stopping command signal on the payline L under the control of the graphic board 68. In this way, the lower side image display panel 16 rearranges the new symbol matrix. In the stop control game execution processing, the main CPU 41 sets the stop switch 82 active (that is, accepts the control input signal from the stop switch 82), determines symbols to be displayed at a time of stopping symbols displayed in the display regions 28 (28*a* to 28*e*) at a timing where the control input signal is received from the stop switch 82 when the stop switch 82 is pressed by the player, and outputs a partial stopping command signal regarding the determined symbols to the graphic board 68.

Figure 15:
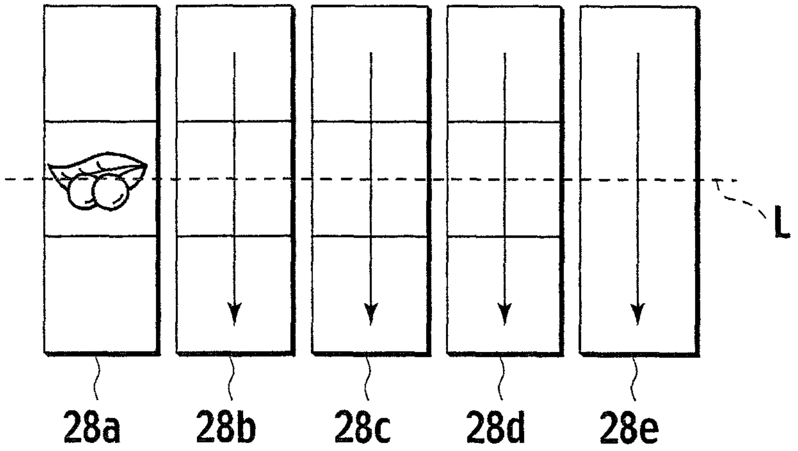
FIG. 15 is a diagram showing one example of a display region when the stop control game is played in a slot machine according to one embodiment of the present invention.
Figure 16:
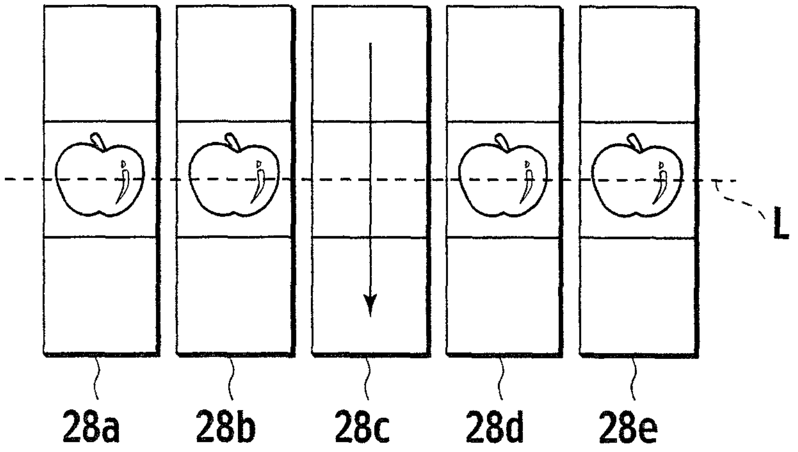
FIG. 16 is a diagram showing one example of a display region when the stop control game is played in a slot machine according to one embodiment of the present invention.

The graphic board 68 controls the lower side image display panel 16 according to the partial stopping command signal. The lower side image display panel 16 stops the symbols determined at the above described timing on the payline L, and continues the scrolling display of the symbols for which the stopping operation by the player is not enabled, as shown in FIG. 15 and FIG. 16, under the control of the graphic board 68.

The main CPU 41 sequentially stops the symbols in the display regions 28 at a timing where the control input signal from the stop switch 82 is received, and outputs a last stopping command signal for stopping a last symbol to the graphic board 68. The graphic board 68 controls the lower side image display panel 16 according to the last stopping command signal. The main CPU 41 judges a combination when all the symbols in the display regions 28 are stopped and makes a payout according to the payout table when a prescribed combination is realized, under the control of the graphic board 68. Namely, the main CPU 41 executes either one of the base game in which a plurality of symbols arranged on the display are rearranged automatically and the stop control game in which the rearrangement of symbols becomes possible upon receiving the control input signal from the external, and in the case of executing the stop control game, makes a payout according to the payout table to the player according to a combination of symbols rearranged by that stop control game.

The ROM 42 stores programs such as BIOS (Basic Input/Output System) to be executed by the main CPU 41, as well as data to be used permanently. When the BIOS is executed by the main CPU 41, the processing for initializing each peripheral device is carried out and the processing for reading the game program and the game system program stored in the memory card 53 through the gaming board 50 is started.

The RAM 43 stores data and programs to be used when the main CPU 41 carries out the processing. Also, the RAM 43 stores the credit amount for jackpot in which a part or a whole of the credits to be paid to the player are stored accumulatively.

The communication interface 44 carries out communications with the host computer or the like that is provided inside the gaming facility through a communication channel.

Also, to the Mother board 40, a main body PCB (Printed Circuit Board) 60 and a door PCB 80 to be described below are connected through the respective USB (Universal Serial Bus). In addition, a power source unit 45 is connected to the mother board 40. When the power is supplied from the power source unit 45 to the mother board 40, the main CPU 41 of the mother board 40 is activated, and the power is supplied to the gaming board 50 through the PCI bus and the CPU 51 is activated.

The controller 48 is formed by the mother board 40 and the gaming board 50 described above. The controller 48 executes the arrangement control in which a plurality of symbols arranged on the lower side image display panel 16 (first display) are scrolled, then symbols to be arranged into a symbol matrix are selected and determined from a plurality of types of symbols in order to rearrange them as a new symbol matrix, and the scrolling state is stopped at the determined symbols, and carries out a control for setting the stop switch 82 active so that it can be operated by the player and providing the stop control game that can be played by the player without betting for a prescribed number of times only in the case where at least one predetermined symbol or a predetermined combination formed by one or more symbols among a plurality of symbols is determined Then, the controller 48 returns the credits stored in the RAM 43 to the slot machine itself when a specific combination of a plurality of symbols is stopped as the stop switch 82 is operated in a game that can be played by the player without betting, that is, the stop control game.

To the main body PCB 60 and the door PCB 80, devices for generating input signals to be inputted into the main CPU 41 and devices whose operations are to be controlled by control signals outputted from the main CPU 41 are connected. The main CPU 41 executes the game program and the game system program stored in the RAM 43 according to the input signals inputted into the main CPU 41. Then, the main CPU 41 carries out the calculation processing according to these programs and stores the result into the RAM 43, and the processing for transmitting control signals to each device as the control processing with respect to each device.

To the main body PCB 60, a lamp 30, a sub CPU 61, a hopper 66, a coin detection unit 67, a graphic board 68, a speaker 29, a touch panel 69, a bill validator 22, a ticket printer 35, a card reader 36, a key switch 38S, and a data display 37 are connected. In addition, to the main body PCB 60, the stop switch 82 and the display lamp 83 that is provided in correspondence to the stop switch 82 are connected.

The lamp 30 is controlled to be turned on or off according to the control signal outputted from the main CPU 41.

The sub CPU 61 carries out the control for scrolling symbols in the five columns of the display regions 28 (28*a* to 28*e*) that are set in the liquid crystal display 17, and is connected to a VDP (Video Display Processor) 46.

The VDP 46 reads out the image data of symbols stored in the image data ROM 47, generates the scrolling images to be displayed at the liquid crystal display 17, and outputs the scrolling images to the liquid crystal display 17.

The hopper 66 is provided inside the cabinet 11, and pays the prescribed number of coins according to the control signal outputted from the main CPU 41, from a coin payout opening 19 to a coin tray 18. The coin detection unit 67 is provided inside the coin payout opening 19, and outputs an input signal with respect to the main CPU 41 when it is detected that the prescribed number of coins are paid from the coin payout opening 19.

The graphic board 68 controls the image display other than symbols to be displayed in the display regions 28 on the upper side image display panel 33 and the lower side image display panel 16 according to the control signal outputted from the main CPU 41. On the credit amount display unit 31 of the lower side image display panel 16, the credit amount stored in the RAM 43 is displayed. Also, on the payout amount display unit 32 on the lower side image display panel 16, the number of coins to be paid is displayed. Also, the graphic board 68 has a VDP for generating image data according to the control signal outputted from the main CPU 41 and a video RAM for temporarily storing the image data generated by the VDP.

The bill validator 22 reads an image of the bill and accepts the legitimate bill into the cabinet 11. The bill validator 22 outputs an input signal with respect to the main CPU 41 according to the amount of that bull when the legitimate bill is accepted. The main CPU 41 stores the credit amount according to the amount of the bill notified by that input signal into the RAM 43.

The ticket printer 35 prints the bar code which encodes data such as the credit amount stored in the RAM 43, the date and time, and the identification number of the slot machine 10, etc., on the ticket, according to the control signal outputted from the main CPU 41, and outputs it as the bar code attached ticket 39.

The card reader 36 reads data from the smart card and transmit it to the main CPU 41, or writes data into the smart card according to the control signal outputted from the main CPU 41. The key switch 38S is provided on the key pad 38, and outputs an input signal to the main CPU 41 when the key pad 38 is operated by the player.

The data display 37 displays the data read by the card reader 36 or the data inputted by the player through the key pad 38, according to the control signal outputted from the main CPU 41.

The stop control switch 82 is a button for stopping scrolling symbols when the stop control game to be described below is executed. When the stop control game is executed, the stop switch 82 is set active, and the display lamp 83 is turned on. Then, the sub CPU 61 carries out a control to stop scrolling symbols at a timing of pressing when the stop switch 82 is pressed by the player.

To the door PCB 80, a control panel 20, a reverter 21S, a coin counter 21C and a cold cathode tube 81 are connected. On the control panel 20, a spin switch 23S corresponding to a spin button 23, a change switch 24S corresponding to a change button 24, a cashout switch 25S corresponding to a cashout button 25, a 1-BET switch 26S corresponding to a 1-BET button 26, and a Max-BET switch 27S corresponding to a Max-BET button 27 are provided. Each one of the switches 23S to 27S outputs an input signal with respect to the main CPU 41 when the corresponding one of the buttons 23-27 is operated by the player.

The coin counter 21C is provided inside the coin slot 21, and validates whether coins entered at the coin slot 21 are legitimate ones or not. Those coins that are not the legitimate ones will be ejected from the coin payout opening 19. Also, the coin counter 21C outputs an input signal with respect to the main CPU 41 when the legitimate coins are detected.

The reverter 21S is operated according to a control signal outputted from the main CPU 41, to distribute the coins recognized as the legitimate coins by the coin counter 21C to the cash box (not shown) provided inside the slot machine 10 or the hopper 66. Namely, when the hopper 66 is filled with coins, the legitimate coins are distributed to the cash box by the reverter 21S. On the other hand, when the hopper 66 is not filled with coins, the legitimate coins are distributed to the hopper 66.

The cold cathode tube 81 functions as the background light provided on the back side of the lower side image display panel 16 and the upper side image display panel 33, and it is turned on according to a control signal outputted from the main CPU 41.

Figure 7:
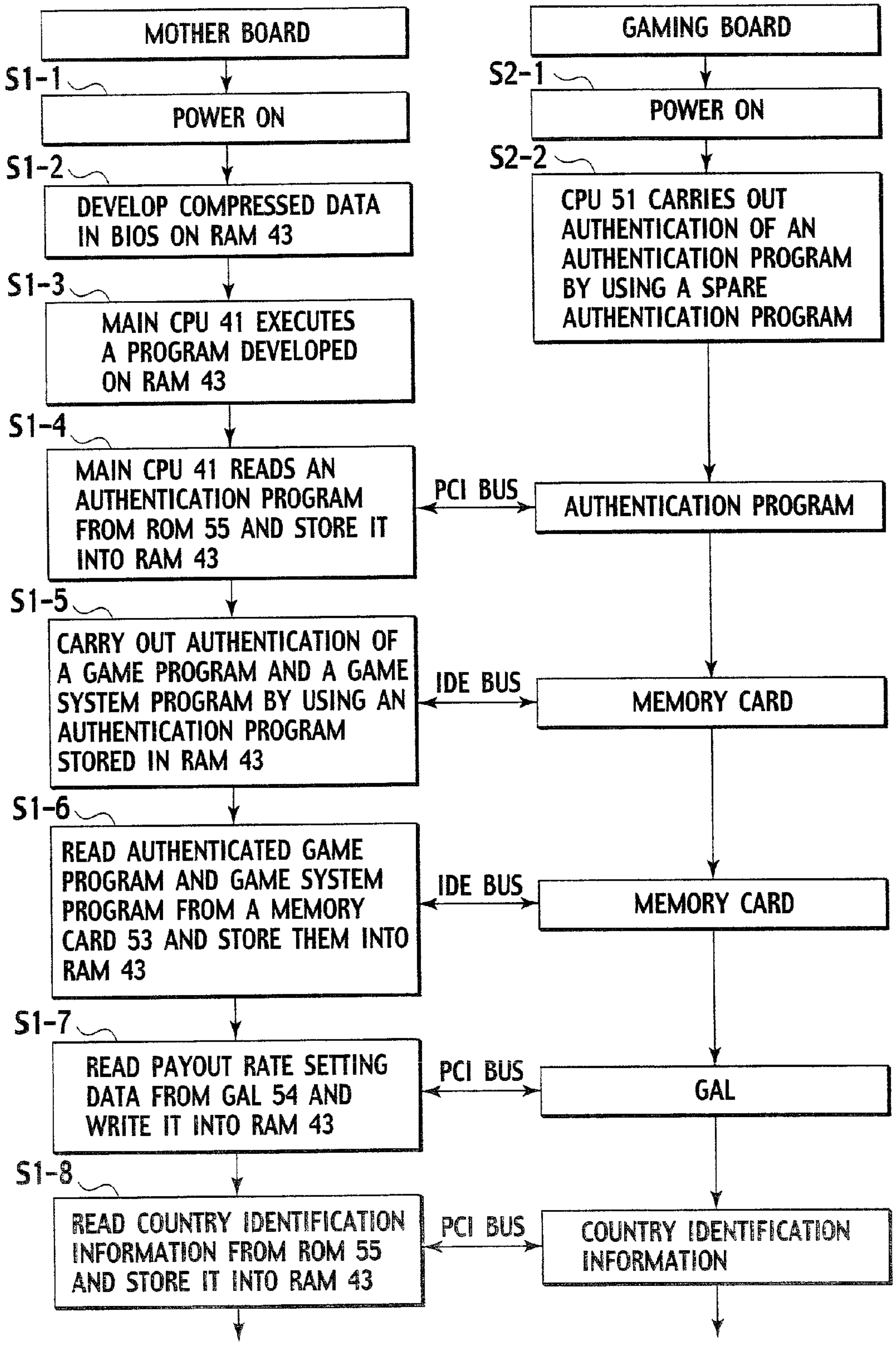
FIG. 7 is a flow chart showing a procedure of an authentication and reading processing of a game program and a game system program by a mother board and a gaming board of a slot machine according to one embodiment of the present invention.

Next, the concrete processing to be carried out at the slot machine 10 will be described. FIG. 7 is a flow chart showing a procedure of the authentication and reading processing for the game program and the game system program (processing at the step S100 shown in FIG. 1), by the mother board 40 and the gaming board 50 shown in FIG. 6. Note here that it is assumed that the memory card 53 is attached to the card slot 53S and the GAL 54 is attached to the IC socket 54S on the gaming board 50.

First, when the power switch is turned on at the power source unit 45, the mother board 40 and the gaming board 50 are activated (steps S1-1, S2-1). When the mother board 40 and the gaming board 50 are activated, the respective independent processings will be carried out in parallel. Namely, at the gaming board 50, the CPU 51 carries out the reading of the spare authentication program stored in the boot ROM 52, and the spare authentication for checking and verifying that the authentication program is not altered in advance, according to the read out spare authentication program, before it is taken into the mother board 40 (step S2-2).

On the other hand, at the mother board 40, the main CPU 41 executes the BIOS stored in the ROM 42 and expands the compressed data incorporated in the BIOS over the RAM 43 (step S1-2). Then, the main CPU 41 executes the BIOS expanded on the RAM 43 to carry out the diagnosis and initialization of various types of peripheral devices (step S1-3).

Then, as the ROM 55 of the gaming board 50 is connected to the main CPU 41 through the PCI bus, the main CPU 41 carries out the reading of the authentication program stored in the ROM 55. In addition, the main CPU 41 carries out the processing for storing the read out authentication program into the RAM 43 (step S1-4).

Next, the main CPU 41 makes an access to the memory card 53 that is attached to the card slot 53S through the IDE bus. Then, the main CPU 41 carries out the reading of the game program and the game system program stored in the memory card 53.

Next, the main CPU 41 carries out the authentication for checking and verifying that the read out game program and game system program are not altered, according to the authentication program stored in the RAM 43 (step S1-5).

When this authentication processing is finished normally, the main CPU 41 stores the authenticated game program and game system program into the RAM 43 (step S1-6). Next, the main CPU 41 makes an access to the GAL 54 that is attached to the IC socket 54S through the PCI bus, reads out the payout rate setting data from the GAL 54, and stores it into the RAM 43 (step S1-7). Next, the main CPU carries out the reading of the country identification information stored in the ROM 55 of the gaming board 50, and stores the read out country identification information into the RAM 43 (step S1-8).

After carrying out the above described processing, the main CPU 41 sequentially reads out and executes the game program and the game system program, to proceed with the base game as described below.

Figure 8:
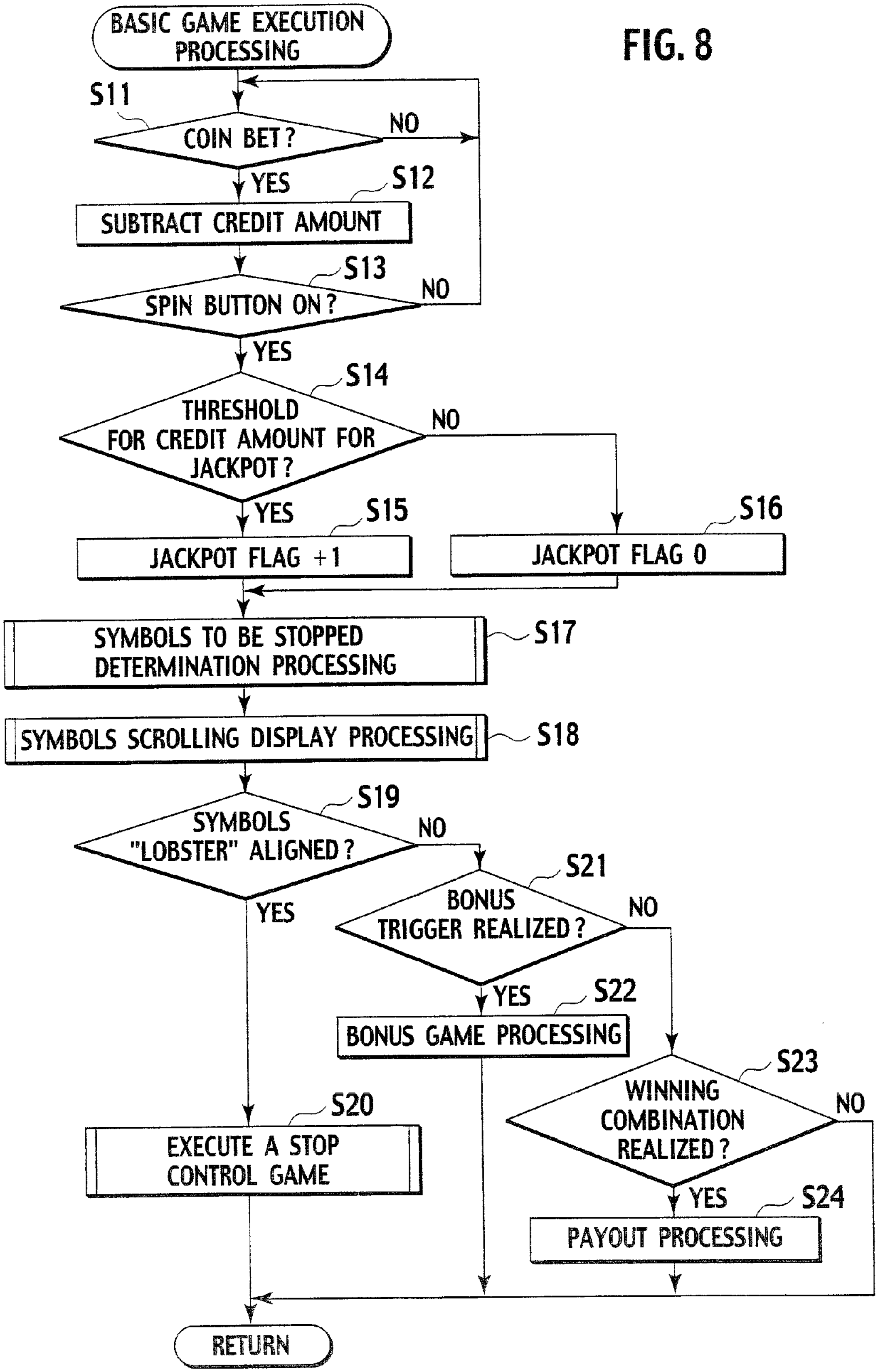
FIG. 8 is a flow chart showing a procedure of a base game processing to be executed by a slot machine according to one embodiment of the present invention.

After the authentication and reading processing shown in FIG. 7 is carried out, the main CPU 41 carries out the base game execution processing. FIG. 8 is a flow chart showing the concrete processing procedure of the base game execution processing shown at the step S200 of FIG. 1.

In the base game execution processing, first, the main CPU 41 judges whether the coin BET has been made or not (step S11). In this processing, the main CPU 41 judges whether the input signal outputted from the 1-BET switch 26S when the 1-BET button 26 is pressed or the input signal outputted from the Max-BET switch 27S when the Max-BET button 27 is pressed has been received or not. When it is judged that the coin BET has not been made, the processing returns to the step S11.

On the other hand, at the step S11, when it is judged that the coin BET has been made, the main CPU 41 carries out the processing for subtracting the credit amount stored in the RAM 43 according to the number of coins to be bet (step S12). Note that when the number of coins to be bet is greater than the credit amount stored in the RAM 43, the processing is returned to the step S11, without carrying out the processing for subtracting the credit amount stored in the RAM 43. Note also that when the number of coins to be bet exceeds the upper limit value (50 in this embodiment) that can be bet per one game, the processing proceeds to the step S13, without carrying out the processing for subtracting the credit amount stored in the RAM 43. In this state, it becomes a state where it is possible to display symbols by the scrolling display in the first display regions 28 (28*a* to 28*e*).

Next, the main CPU 41 judges whether the spin button 23 is turned ON or not (step S13). In this processing, the main CPU 41 judges whether the input signal outputted from the spin switch 23S when the spin button 23 is turned ON is received or not. When it is judged that the spin button 23 is not turned ON, the processing is returned to the step S11. Note that in the case where the spin button 23 is not turned ON (the case where a command indicating the finishing of the game is inputted without turning the spin button 23 ON, for example), the main CPU 41 cancels the subtraction result at the step S12.

In this embodiment, the exemplary case of carrying out the processing for subtracting the credit amount (step S12) after the coin BET is made (step S11), before making the judgement as to whether the spin button 23 is turned ON or not (step S13) will be described. However, the present invention is not limited to this exemplary case. For example, it is also possible to make the judgement as to whether the spin button 23 is turned ON or not (step S13) after the coin BET is made (step S11), and carry out the processing for subtracting the credit amount (step S12) when it is judged that the spin button 23 is turned ON (step S13 YES).

Then, at the step S14 of FIG. 8, when it is judged that the spin button 23 is turned ON, the main CPU 41 judges whether the amount of credits for jackpot payout is greater than or equal to the threshold or not. In the case where the amount of credits for jackpot payout is greater than or equal to the threshold, the jackpot flag indicating that the jackpot payout is possible is set to +1 at the step S15. On the other hand, in the case where the amount of credits for jackpot payout is less than the threshold at the step S14, the main CPU 41 does not erect the jackpot flag in the RAM 43 at the step S16.

Then, when it is judged that the spin button 23 is turned ON, the main CPU 41 carries out the symbols to be stopped determination processing (step S14). In this symbols to be stopped determination processing, the main CPU 41 determines symbols to be displayed through the display windows 15 at a time of stopping symbols in the display regions 28

(28*a* to 28*e*) by executing the symbols to be stopped determination program stored in the RAM 43. In this way, the combination of symbols to be stopped on the payline L is determined.

Next, the main CPU 41 carries out the symbols scrolling display processing (step S18). This processing is a processing for stopping symbols in the display regions 28 (28*a* to 28*e*) after the scrolling of symbols in the display regions 28 (28*a* to 28*e*) is started, such that symbols determined at the step S17 will be stopped on the payline L.

Next, the main CPU 41 judges whether a combination of symbols stopped at the payline L is a combination of symbols "LOBSTER" which is a prescribed combination or not (step S19). In the case where a combination of symbols "LOBSTER" is stopped on the payline L, the stop control game to be described below will be executed (step S20). Note that the stopping of a prescribed combination for a plurality of times may be set as a trigger for executing the stop control game. For example, it may be made such that the stop control game is executed when a combination of symbols "LOBSTER" is stopped on the payline L consecutively for a plurality of times.

On the other hand, in the case where a combination of symbols stopped on the payline L is not a combination of symbols "LOBSTER", the main CPU 41 judges whether the bonus trigger is realized or not, that is, whether a combination of symbols "APPLE" is stopped on the payline L or not, and when it is judged that the bonus trigger is realized, the main CPU 41 executes the bonus game processing to be described below (step S21).

Also, when it is judged that the bonus trigger is not realized, the main CPU 41 judges whether the winning combination is realized or not, that is, whether a combination of symbols "PLUM" is stopped or not, for example (step S23), and when it is judged that the winning combination is realized, the main CPU 41 carries out the payout processing corresponding to this winning combination (step S24). In the case of depositing a part of the credits to be paid, the main CPU 41 adds the prescribed amount of credit to the credit amount stored in the RAM 43.

Also, in the case of paying out the credits, the main CPU 41 makes the payout of a prescribed amount of credits by transmitting the control signal to the hopper 66. At this point, the coin detection unit 67 counts the number of coins paid from the hopper 66, and transmits a payout completion signal to the main CPU 41 when the count value reached the specified number. As a result, the main CPU 41 stops the driving of the hopper 66 and finishes the coin payout processing.

In the case where it is judged that the winning combination is not realized (step S23: NO), that is in the case of the lost game, the credits will not be paid out. In this way, the base game will be executed.

Figure 9:
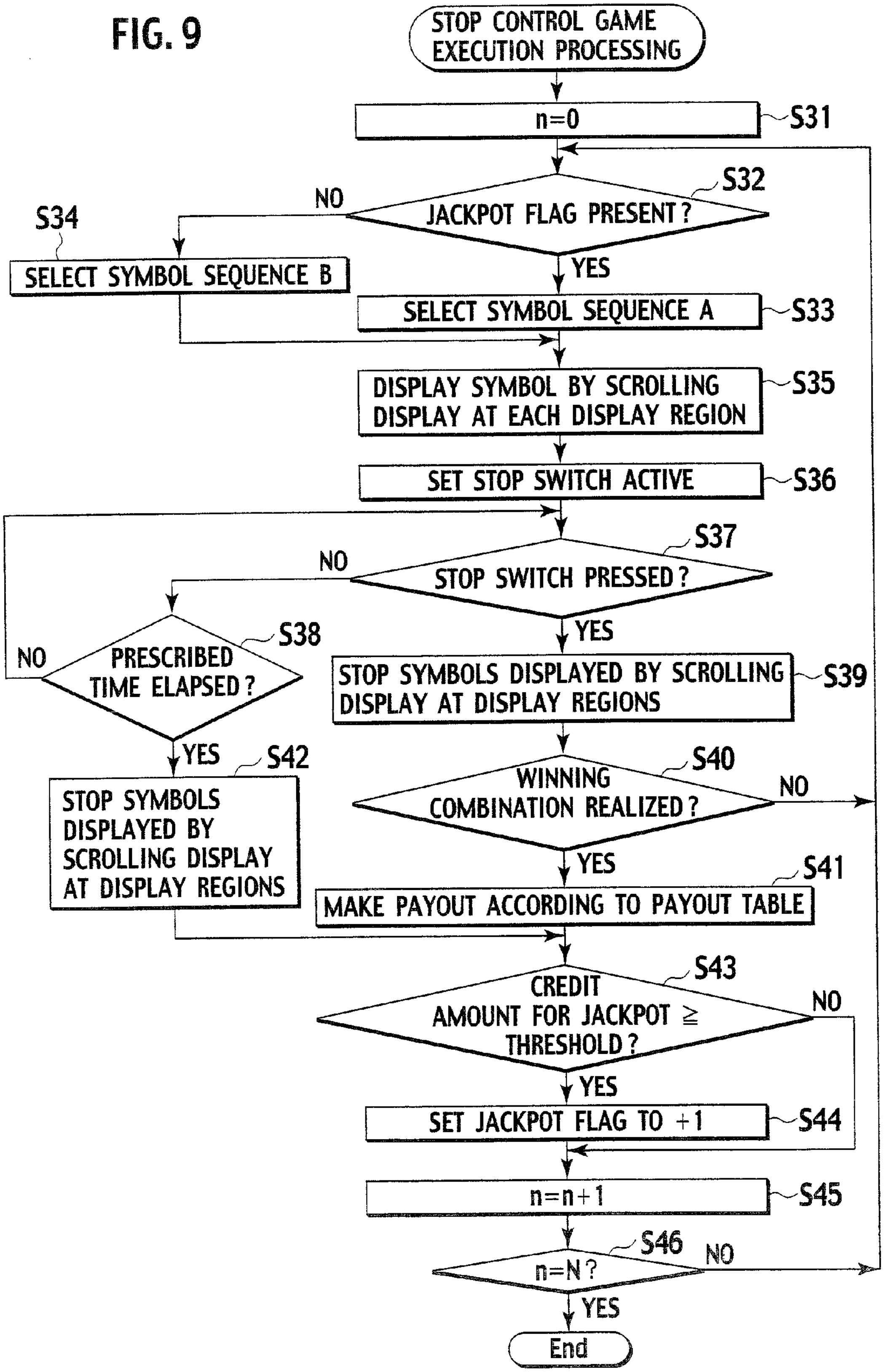
FIG. 9 is a flow chart showing a procedure of a stop control game processing to be executed by a slot machine according to one embodiment of the present invention.

FIG. 9 is a flow chart showing a processing procedure of the stop control game. In the case where the stop control game is executed by the processing of the step S20 shown in FIG. 8, the main CPU 41 sets the number of times n for having played the stop control game to be n=0 (step S31). The main CPU 41 checks the presence/absence of the jackpot flag indicating that the jackpot payout is possible which is stored in the RAM 43 (step S32). When the jackpot flag is present at the step S32, a symbol series A shown in FIG. 3 that contains "JACKPOT 7" which is a symbol for enabling the jackpot payout is selected at the step S33. On the other hand, when the jackpot flag is absent (step S32: NO), a symbol series B shown in FIG. 4 that does not contain a symbol for enabling the jackpot payout is selected at the step S34. Then, the main CPU 41 displays the selected symbol series by the scrolling display in the five columns of the display regions 28 (28*a* to 28*e*) (step S35). Also, the main CPU 41 sets the operation of the stop switch 82 active (step S36).

In the processing of the step S35, it may be made such that the scrolling of symbols for the stop control game is automatically started when the stop control game is executed, that is, when the symbols "LOBSTER" are stopped by the processing of the step S20 of FIG. 8, or it may be made such that the scrolling of symbols is started after the 1-BET button 26 or the Max-BET button 27 is newly pressed and the spin button 23 is pressed.

Figure 13:
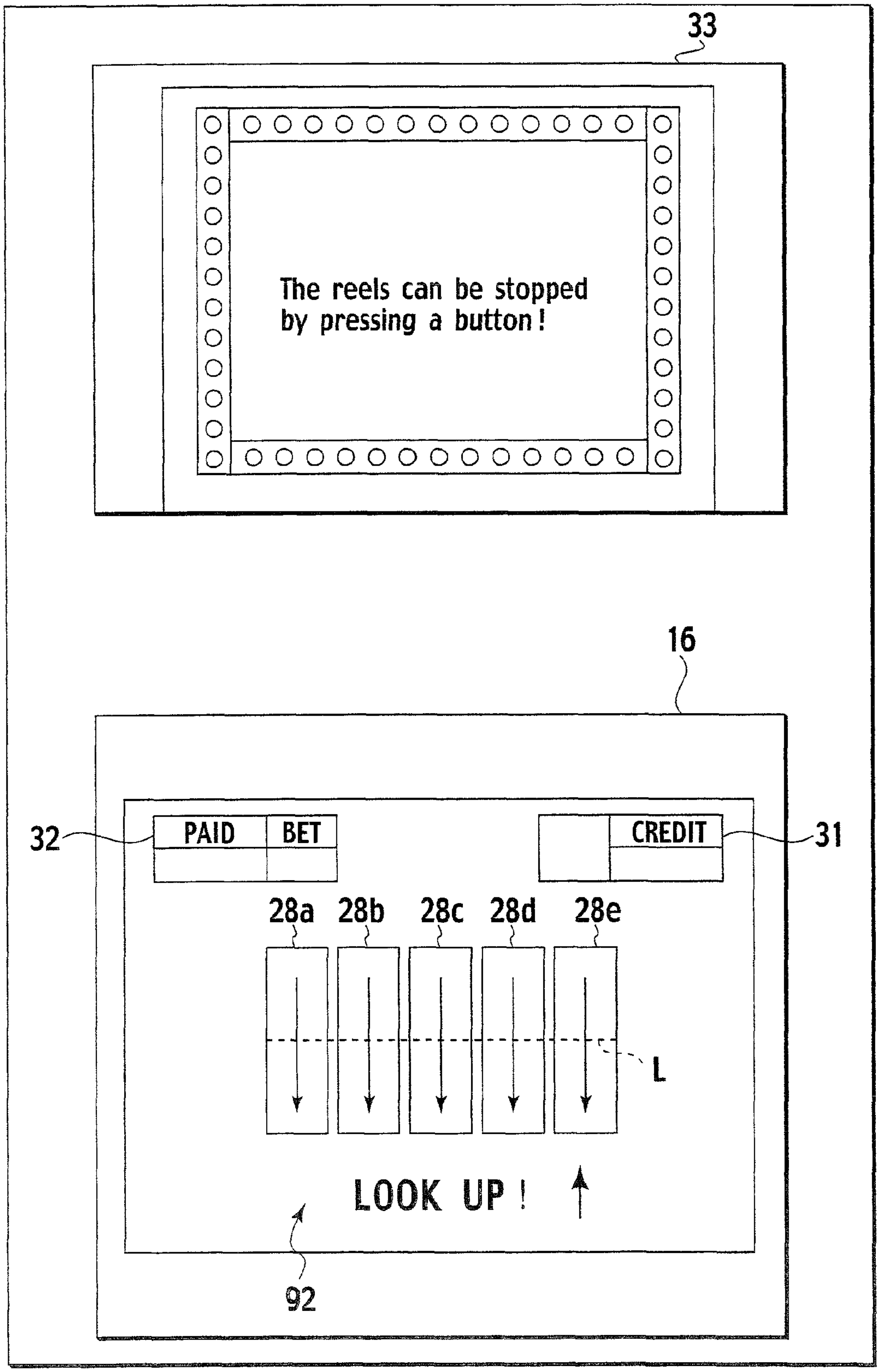
FIG. 13 is a diagram showing an exemplary display for notifying that the stop control game is played in a slot machine according to one embodiment of the present invention.

At the step S36, when the main CPU 41 sets the operation of the stop switch 82 active, the letters "The reels can be stopped by pressing a button!" are displayed on the upper side image display panel 33 of the slot machine 10 as shown in FIG. 13. In addition, at a lower portion of the lower side image display panel 16, an image 92 of an arrow pointing upwards and letters "LOOK UP!" is displayed, and the display lamp 83 attached to the stop switch 82 is turned on. In this way, it is possible to notify to the player that the stop control game is executed. It may also be made to notify this at the same time by the sound or the electric decoration.

Next, the main CPU 41 judges whether the stop switch 82 is pressed or not (step S37). In the case where the stop switch 82 is pressed (step S37: YES), the main CPU 41 stops the scrolling symbols in the display regions 28 at a timing where the stop switch 82 is pressed (step S39). In this case, the main CPU 41 accepts a detection signal of a detection sensor (not shown) provided at the stop switch 82, and carries out the processing to stop the scrolling symbols when it is detected that the stop switch 82 is pressed.

The main CPU 41 judges whether a winning combination associated with a payout (see FIG. 5) is realized on the payline L or not (step S40). In the case where it is judged that a winning combination associated with a payout is realized (step S40: YES), the payout is made according to the payout table at the step S41. In the case where it is judged that a winning combination is not realized (step S40: NO), the payout will not be made.

On the other hand, after the stop switch 82 is set active at the step S36, if the pressing of the stop switch 82 is not detected even after a prescribed time has elapsed (step S38: YES), the processing to stop the scrolling symbols is carried out (step S42). In this case, it is stopped at a combination of symbols that is not associated with a payout.

In the case where the jackpot flag is detected at the step S32, the combinations that can be realized at the step S39 to the step S41 include a jackpot combination associated with a jackpot payout. Namely, when the player succeeds in stopping a combination of jackpot symbols ("JACKPOT 7") by pressing the stop switch 82, the jackpot payout is made. The main CPU 41 makes the payout at the step S41, and stores a part of credits to be paid to the player as the credits for jackpot in the RAM 43 accumulatively, according to a combination of symbols stopped in the display regions 28 (28*a* to 28*e*).

At the step S43, the main CPU 41 judges whether the amount of credits for jackpot is greater than or equal to a prescribed threshold or not, and in the case where this condition is satisfied, the jackpot flag is erected at the step S44. Then, at the step S45, the main CPU 41 sets a counter for the number of times for having played the stop control game that is provided in the RAM 43 to be +1, and at the step S46, the main CPU 41 judges whether the number of times for having played the stop control game that is finished has reached a prescribed number of times N or not. The prescribed number of times N is set to be 10 times, for example.

In the case where it has not reached to the prescribed number of times N at the step S46, the processing from the step S32 is repeated. On the other hand, in the case where it has reached to the prescribed number of times N, the stop control game is terminated.

Consequently, as shown in FIG. 9, in the stop control game, when the player succeeds in stopping the scrolling symbols at a combination of specific symbols by pressing the stop switch 82 during a prescribed number of times of the free game allowed, the player can receive the payout corresponding to that combination according to the payout table.

In the step S35 to the step S39 described above, as the processing for stopping the scrolling symbols, it is assumed that the all symbols displayed in the display regions 28*a* to 28*e* will be displayed by the scrolling display at a time of the start of the stop control game in this embodiment.

For example, the manner of display is changed sequentially from the left side (display region 28*a*) such that it can be recognized that the stopping operation is possible. For example, the background of the display region 28 in which symbols can be stopped is flashed or turned into a bright display. When it is detected that the stop switch 82 is pressed by the player, the scrolling in the display region 28*a* is stopped, and then it is displayed such that the player can recognize that the stopping operation is possible in a neighboring display region 28*b*. In the example shown in FIG. 15, the symbol "CHERRY" is already stopped and displayed in the display region 28*a*, while symbols are scrolled in the display regions 28*b* to 28*e*. Although not indicated in the figure, the display region 28*b* is displayed as flashing in FIG. 15.

In this way, the symbols scrolled in the display regions 28 are stopped sequentially, and eventually, when symbols in all the display regions 28 are stopped, whether it is a combination associated with a payout or not is judged at the step S39.

Also, as another processing at a time of making the player to stop the scrolling symbols at the step S35 to the step S39, it is possible to consider a processing in which once any one region among the display regions 28*a* to 28*e* is stopped, symbols are automatically stopped until a state where a winning combination selected from the payout table shown in FIG. 5 is almost realized on the payline L, and then the player is made possible to stop the remaining one symbol to be displayed in the display regions. For example, in the example shown in FIG. 16, symbols are already stopped in a combination of symbols "APPLE" in the display regions 28 other than a display region 28*c*. Namely, if the player can stop a symbol "APPLE" in the display region 28*c*, it is possible to realize a combination in the payout table of FIG. 5, and as a result it is possible to obtain a bonus game.

Note that the payout table of FIG. 5 described in this embodiment is shared at a time of the stop control game and at a time of the base game, but it may be made to provide separate payout tables. Even in the case of sharing the payout table, a separate payout that becomes valid during the stop control game for a combination to become a trigger to the stop control game such as that of symbols "LOBSTER", for example, is determined in advance. For example, it can be made to be a payout of a prescribed amount of credits during the stop control game.

Figure 10:
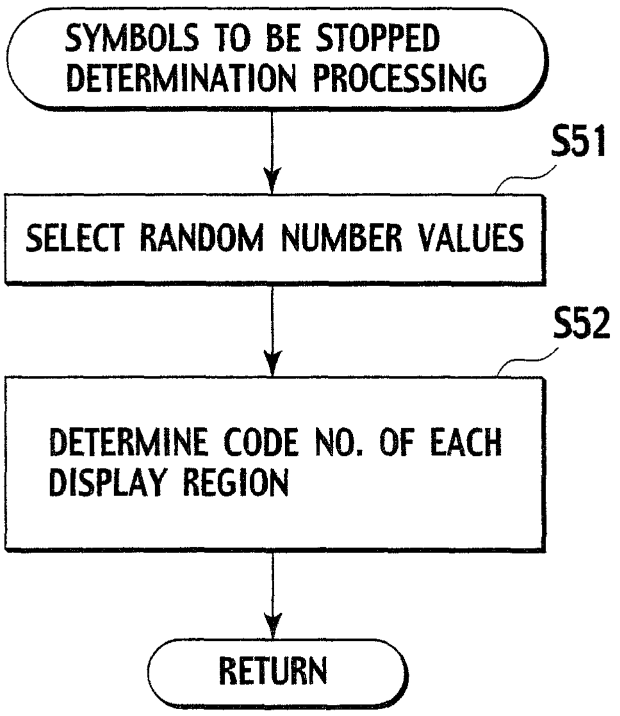
FIG. 10 is a flow chart showing a procedure of a symbols to be stopped determination processing to be executed by a slot machine according to one embodiment of the present invention.

FIG. 10 is a flow chart showing a procedure of the symbols to be stopped determination processing shown at the step S17 of FIG. 8. This processing is a processing to be carried out as the main CPU 41 executes the symbols to be stopped determination program stored in the RAM 43.

First, the main CPU 41 selects a random number value corresponding to each column of the display regions 28 (28*a* to 28*e*) from a numerical value range of 0 to 255, by executing the random number generation program contained in the symbols to be stopped determination program (step S51).

Next, the main CPU 41 refers to the symbol weighing data according to the payout rate setting data outputted from the GAL 54 and stored in the RAM 43, and determines the code numbers (see FIG. 3 and FIG. 4) for the display regions 28 (28*a* to 28*e*) of the five columns according to the selected five random number values (step S52).

The code numbers of the display regions 28 (28*a* to 28*e*) correspond to the code numbers of symbols to be stopped and displayed on a middle level (one the payline L0) of the display regions. The main CPU 41 determines the winning combination by determining the code numbers of the display regions 28 (28*a* to 28*e*). For example, in the case of the symbol series A shown in FIG. 3, when the code numbers of the display regions 28 (28*a* to 28*e*) are determined as "00", "00", "00", "00" and "00", the main CPU 41 has determined the combination of symbols "JACKPOT 7" as the winning combination.

Figure 11:
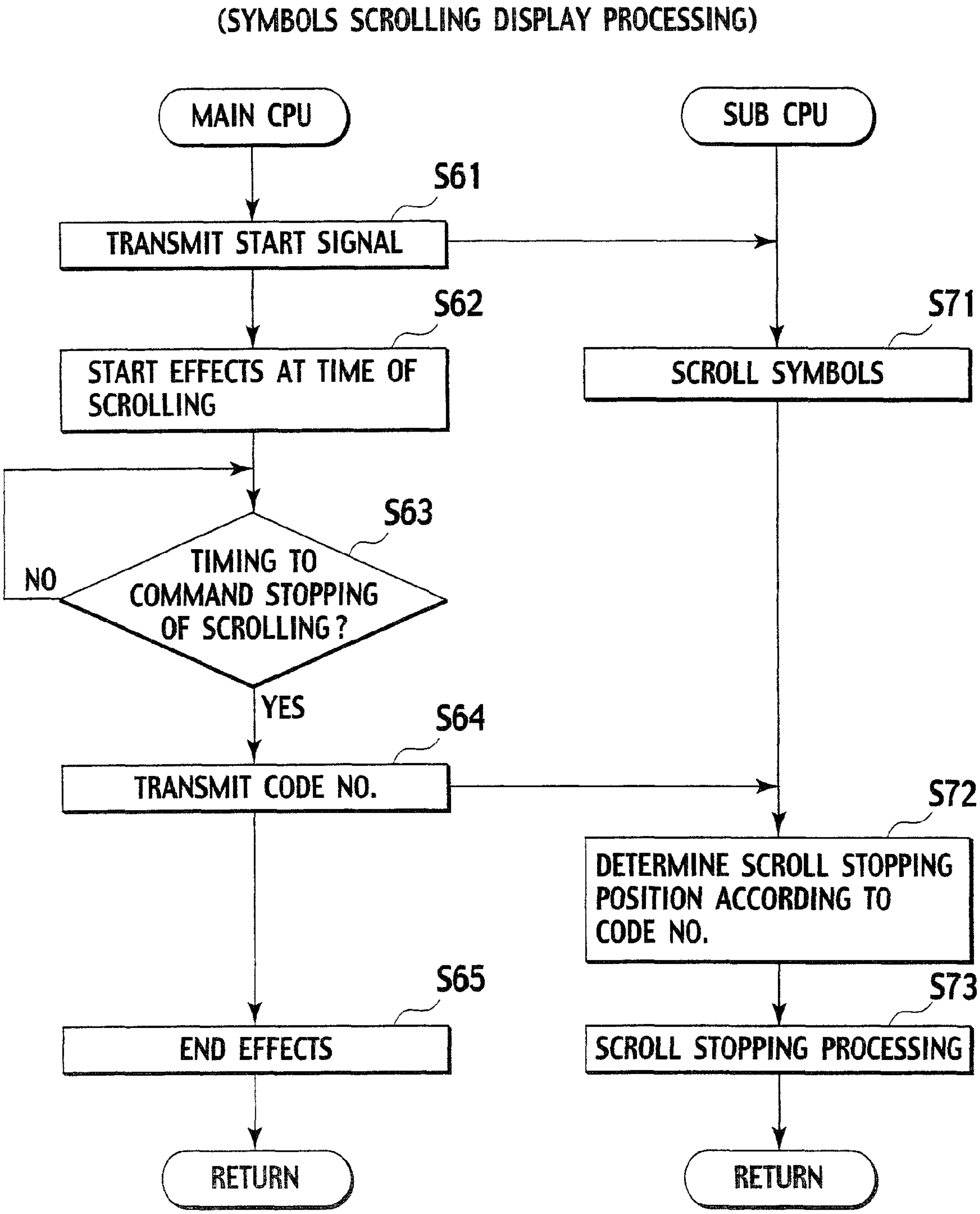
FIG. 11 is a flow chart showing a procedure of a symbols scrolling display processing to be executed by a slot machine according to one embodiment of the present invention.

FIG. 11 is a flow chart showing a procedure of the symbols scrolling display processing shown at the step S18 of FIG. 8. This processing is a processing carried out between the main CPU 41 and the sub CPU 61.

First, the main CPU 41 transmits a start signal indicating that the symbols scrolling display will be started in the display regions 28 of the liquid crystal display 17, to the sub CPU 61 (step S61). Upon receiving the start signal from the main CPU 41, the sub CPU 61 reads out the image data of symbols stored in the image data ROM 47, and carries out the scrolling of symbols in the five columns of the display regions 28 (28*a* to 28*e*) of the liquid crystal display 17 (step S71). As a result, the scrolling of symbols is started in the five columns of the display regions 28 (28*a* to 28*e*).

After transmitting the start signal to the sub CPU 61 at the step S61, the main CPU 41 executes the effects at a time of the symbol scrolling (step S62). This processing is a processing for displaying the images on the lower side image display panel 16 and outputting sounds from the speaker 29, etc., during a period (three seconds, for example) determined according to the result of the symbols to be stopped determination processing (step S17 of FIG. 8), etc.

Next, the main CPU 41 judges whether it is a timing for commanding the stopping of the scrolling or not (step S63 of FIG. 11).

When it is judged that it is not a timing for commanding the stopping of the scrolling at the step S63, the processing is returned to the step S63 and the effects at a time of the scrolling are continued. Also, when it is judged that it is a timing for commanding the stopping of the scrolling at the step S63, the main CPU 41 transmits the code numbers of symbols stored in the RAM 43 to the sub CPU 61 (step S64). Upon receiving the code numbers of symbols from the main CPU 41, the sub CPU 61 determines the scrolling stopping position such that it corresponds to these code numbers (step S72).

After that, the scrolling stopping processing is carried out, and symbols are stopped and displayed in the display regions 28 (28*a* to 28*e*) (step S73). Also, the display processing of the effect images by the main CPU 41 is finished (step S65).

Figure 12:
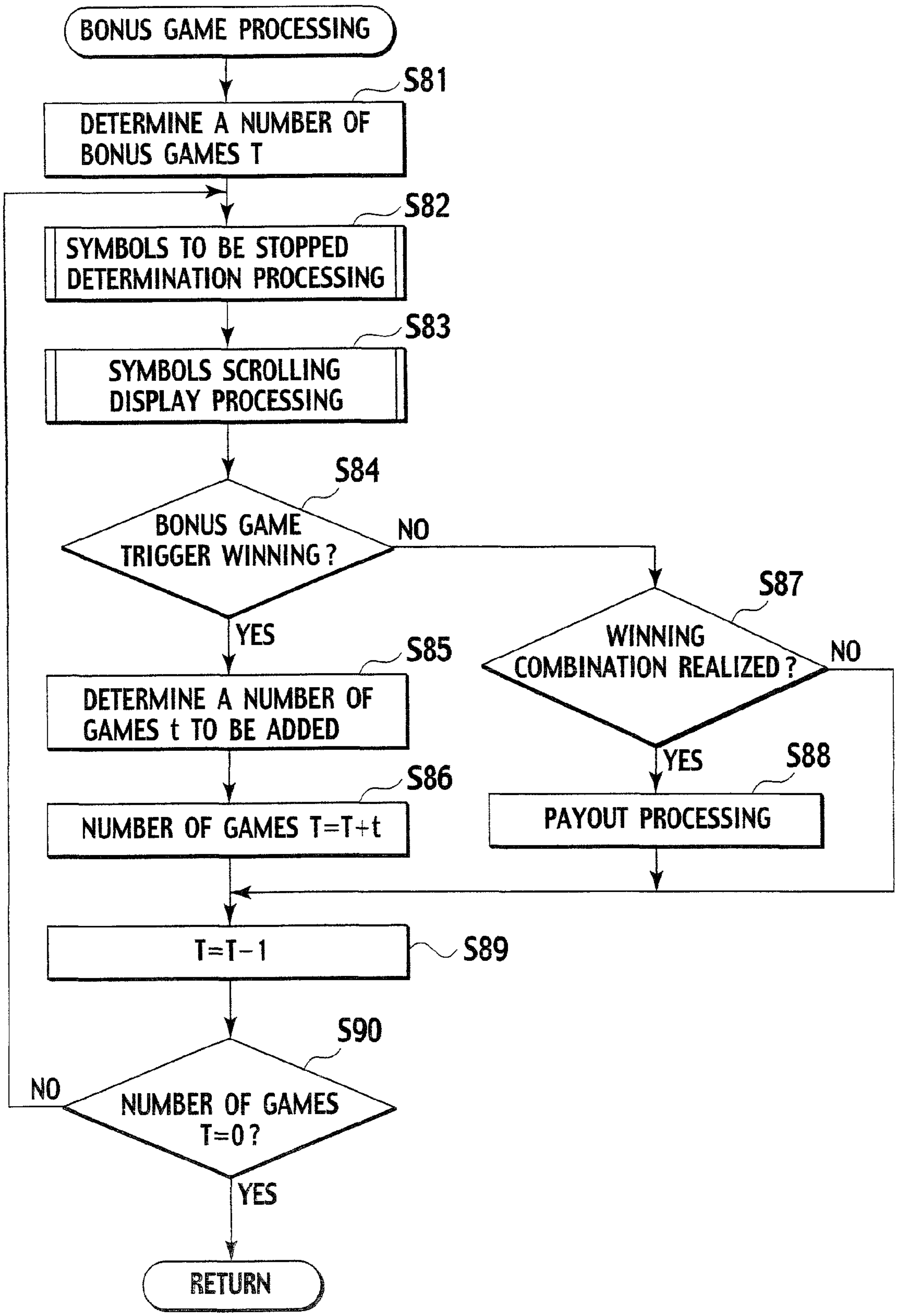
FIG. 12 is a flow chart showing a procedure of a bonus game processing to be executed by a slot machine according to one embodiment of the present invention.

FIG. 12 is a flow chart showing a procedure of the bonus game processing shown at the step S22 of FIG. 8. In the bonus game processing, first, the main CPU 41 determines the number of times for executing the bonus game T from a range of 10 to 25 games, according to the random number value obtained by executing the random number generation program contained in the symbols to be stopped determination program stored in the RAM 43 (step S81). The main CPU 41 stores the determined data on the number of games T of the bonus game into the RAM 43.

Next, the main CPU 41 carries out the symbols to be stopped determination processing (step S82) and the symbols scrolling display processing (step S83). The processing of the step S82 is similar to the processing described above with reference to FIG. 10. Also, the processing of the step S83 is similar to the processing described above with reference to FIG. 11. These processings have already been described above, so that their description will be omitted here.

Next, in FIG. 12, the main CPU 41 judges whether the bonus game trigger is realized or not, that is, whether the combination of symbols "APPLE" is stopped on the payline that is set active in the display regions 28 (28*a* to 28*e*) or not (step S84). When it is judged that the bonus game trigger is realized (step S84 YES), the number t of repetitions of the bonus game is newly determined (step S85), and the determined number t of repetitions is added to the current number of games T of the bonus game (step S86). In this way, when the bonus game is won again during the bonus game, the remaining number of the bonus games will be increased.

When the bonus game is not realized, the main CPU 41 judges whether the winning combination is realized or not (step S87). When it is judged that the winning combination is realized, the main CPU 41 makes the payout of coins according to the number of coins entered and the winning combination (step S88). At this point, the payout according to the payout table shown in FIG. 5 is made.

When the processing of the steps S86 or S88 is executed, or when it is judged that any of the winning combinations is not realized at the step S87 (it is judged as a lost game), the main CPU 41 reads out the number of games T of the bonus game stored in the RAM 43, subtracts one from the read out value of the number of games T, and stores the number of games T after the subtraction into the RAM 43 again (step S89).

Next, the main CPU 41 judges whether the number of games T of the bonus game has reached the number of times determined at the step S81 or not (step S90). More specifically, it is judged by judging whether the number of games T stored in the RAM 43 has become zero or not, and when the number of games T is not zero, that is, when it is judged that the number of executed bonus games has not reached the number of times determined at the step S81, the processing is returned to the step S82 and the above described processing is repeated.

On the other hand, when the number of games T is zero, that is, when it is judged that the number of executed bonus games has reached the number of games T determined at the step S81, the processing is finished. The bonus game is carried out in this way.

As described above, in the slot machine and the playing method according to this embodiment, the stop control game in which the player can stop symbols scrolled in the display regions by pressing the stop switch 82 is started when a combination of prescribed symbols such as symbols "LOBSTER" for example is stopped on the payline L0. Then, if the player succeeds in stopping symbols displayed by the scrolling display by pressing the stop switch 82 and a combination associated with a payout is realized, the corresponding payout is made. In particular, it is applicable to the jackpot payout in which a part of the credits to be paid to the player is accumulatively stored and the payout of the accumulatively stored credits is made when symbols are rearranged into a specific combination, so that it is possible to make the player to have a higher interest to the stop control game. When the stop control game is executed, a possibility for realizing a combination of symbols associated with a higher payout becomes higher for the player who can operates the stop switch 82 at more appropriate timing, so that it is possible to increase the level of technicality required to the player in the game.

Next, as another embodiment of the present invention, the slot machine 100 in which a rotatable mechanical reel is provided on a side portion of the display regions 28 will be described with references to FIG. 17 to FIG. 21.

The slot machine 100 has a dedicated display (display window) for scrolling at least one symbol for setting the stop switch active which will be described below, and characterized in that the stop switch is set active only in the case where the at least one symbol arranged in this dedicated display is determined to be a predetermined symbol by the stopping operation of the player.

The slot machine 100 has a second display for scrolling at least one symbol for setting the stop switch active which will be described below. Then, a game for scrolling a plurality of symbols arranged in this second display and then stopping them is executed by the operation of the player, and when specific symbols are stopped by the operation of the stop switch 82 in that game, a prescribed number of times of the stop control game will be provided.

Figure 17:
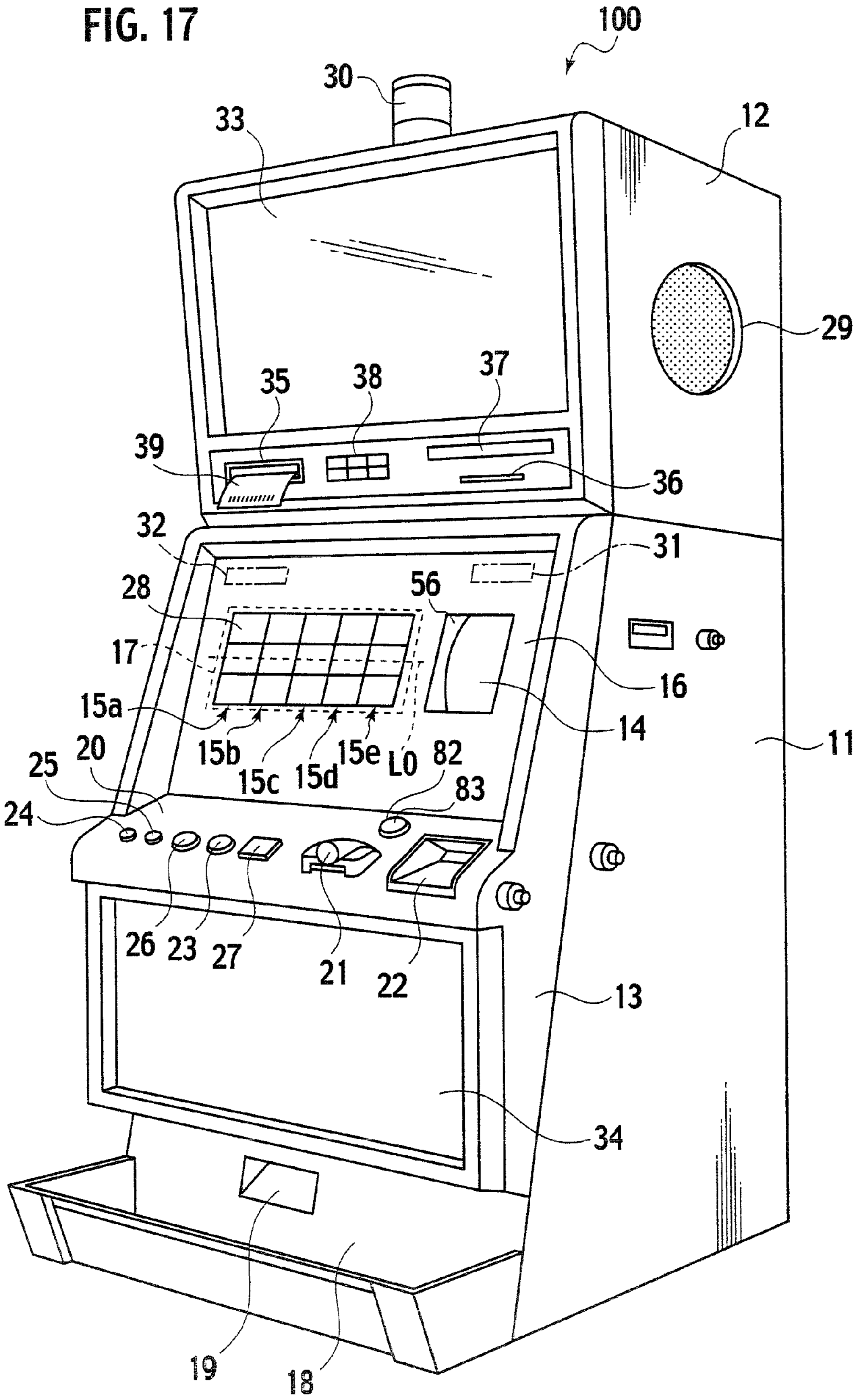
FIG. 17 is a diagram showing an outward appearance of a slot machine according to another embodiment of the present invention.

In the slot machine 100, those elements which have the same operation and function as in the slot machine shown in FIG. 2 are given the same reference numerals and their detailed description will be omitted. As shown in FIG. 17, the slot machine 100 has a mechanical reel 14 in a vicinity of a side portion of the liquid crystal display 19 inside the cabinet 11. On the side face of that reel 14, a plurality of symbols are displayed such that the player can see them through a display window 56 provided on the main door 13. This reel 14 starts the scrolling when a combination of prescribed symbols is realized in the display regions 28 (28*a* to 28*e*), and stops at a symbol that passed the display window 56 at a timing where the stop switch 82 is pressed, when the stop switch 82 is pressed by the player. The player can see the symbol at a time of stopping the reel 14 through the display window 56.

Also, when it becomes possible for the player to operate the reel 14 and a combination of prescribed symbols is realized in the display regions 28 (28*a* to 28*e*), the surrounding of the reel 14 is displayed bright, and moreover, the display lamp 83 provided at the stop switch 82 is turned on. In this way, it is possible to notify to the player that the rotating reel 14 can be stopped by pressing the stop switch 82.

Figure 18:
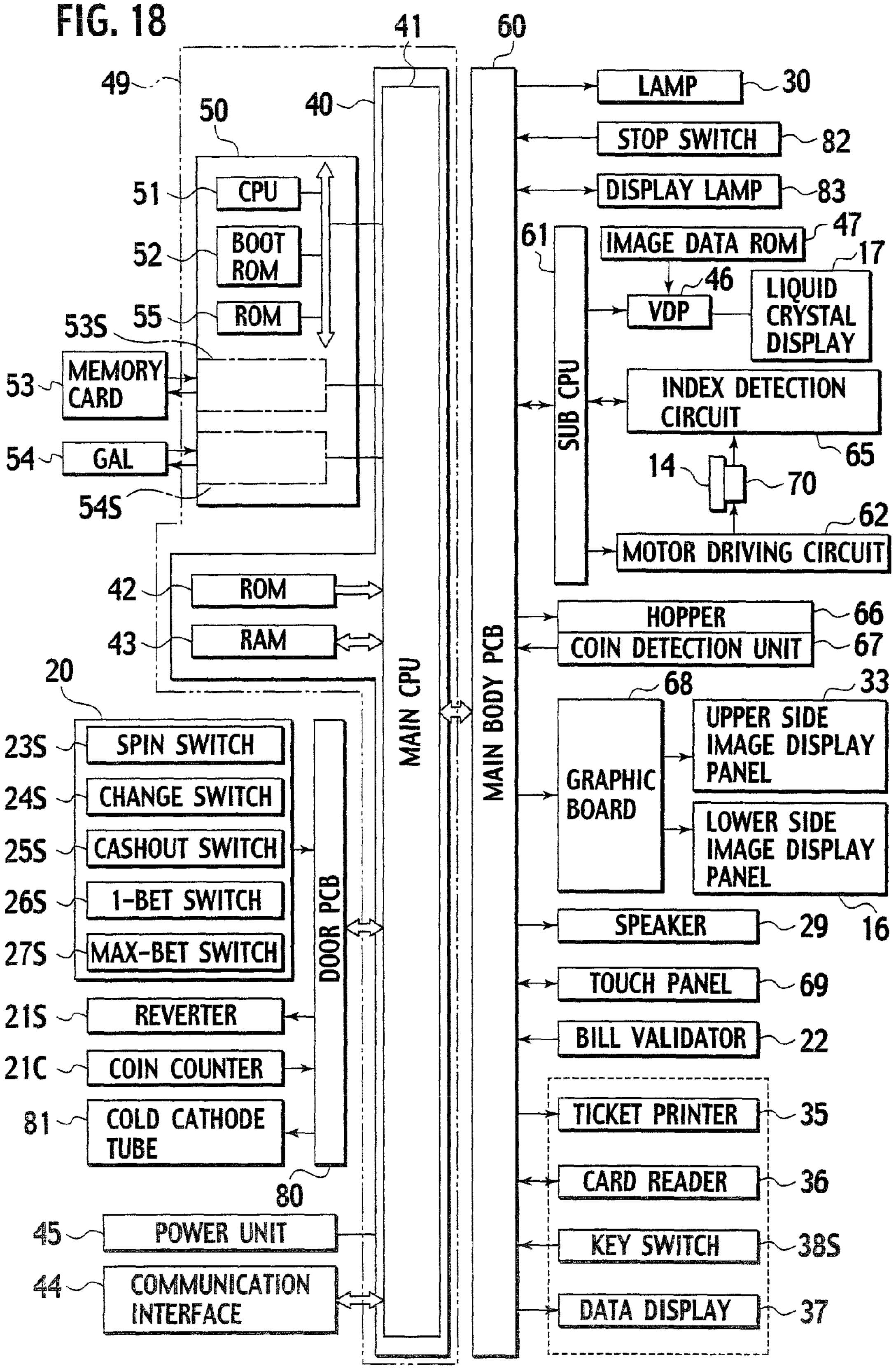
FIG. 18 is a block diagram showing a control circuit of a slot machine according to another embodiment of the present invention.

FIG. 18 is a block diagram showing a control circuit of the slot machine 100 shown in FIG. 17. The slot machine 100 has a motor driving circuit 62 for controlling the rotation of the reel 14 connected to the sub CPU 61. To the reel 14, a stepping motor 70 is connected, and the stepping motor 70 starts the rotation according to the driving signal outputted from the motor driving circuit 62, and in conjunction with that the reel 14 is rotated. Also, the sub CPU 61 carries out a control for accepting the operation input of the stop switch 82 and stopping the rotating reel 14 when it is detected that the stop switch 82 is operated by the player.

To the reel 14, an index detection circuit 65 for detecting a stopping position of the reel 14 is connected, and the data indicating the stopping position of the reel 14 detected by that index detection circuit 65 is outputted to the sub CPU 61. The sub CPU 61 can recognize the stopping position of the reel 14, that is, at which symbol the reel 14 has stopped, according to this data.

The reel 14 starts the rotation and scrolling only in the case where a combination of symbols stopped and displayed in the display regions 28 is determined to be a prescribed combination (a combination of symbols "LOBSTER", for example).

At this point, the stop switch 82 provided at a lower side of this reel 14 is set active. It is made such that the rotating reel 14 is stopped when the stop switch 82 is pressed by the player. Then, whether or not to start the stop control game is determined depending on whether or not a prescribed symbol, such as a symbol "OCTOPUS" for example, is stopped at a position visible through the display window 56 provided at a front side of this reel 14.

At the slot machine 100, the main CPU 41 has a function of a controller for controlling the slot machine 100 overall. In particular, the main CPU 41 carries out a control for outputting a command signal to make the sub CPU 61 to scroll symbols in the display regions 28 of the liquid crystal display 17, a control for determining symbols to be stopped in the display regions 28 after symbols in the display regions 28 are scrolled, and a control for displaying symbols such that the determined symbols are stopped in the display regions 28 (28*a*-X to 28*e*-Z) at positions visible through the display windows 15 (15*a* to 15*e*).

Namely, the main CPU 41 carries out an arrangement control in which a plurality of symbols displayed on the lower side image display panel 16 as the first display are scrolled, and then symbols to be arranged into a symbol matrix are selected and determined from a plurality of types of symbols in order to rearrange them as a new symbol matrix, and the scrolling state is stopped at the determined symbols.

Also, the main CPU 41 transmits a command signal for rotating the reels 14 to the sub CPU 61 when a combination of prescribed symbols (symbols of "LOBSTER" for example) are rearranged on the payline that is set with respect to the symbol matrix, and the sub CPU 61 outputs a rotation command signal for the reel 14 to the motor driving circuit 62. Then, the motor driving circuit 62 drives the stepping motor 70 into rotation, and in conjunction with that the reel 14 is rotated. As a result, symbols are scrolled in the display regions 28, and symbols displayed on the reel 14 are scrolled as the reel 14 rotates.

Figure 20:
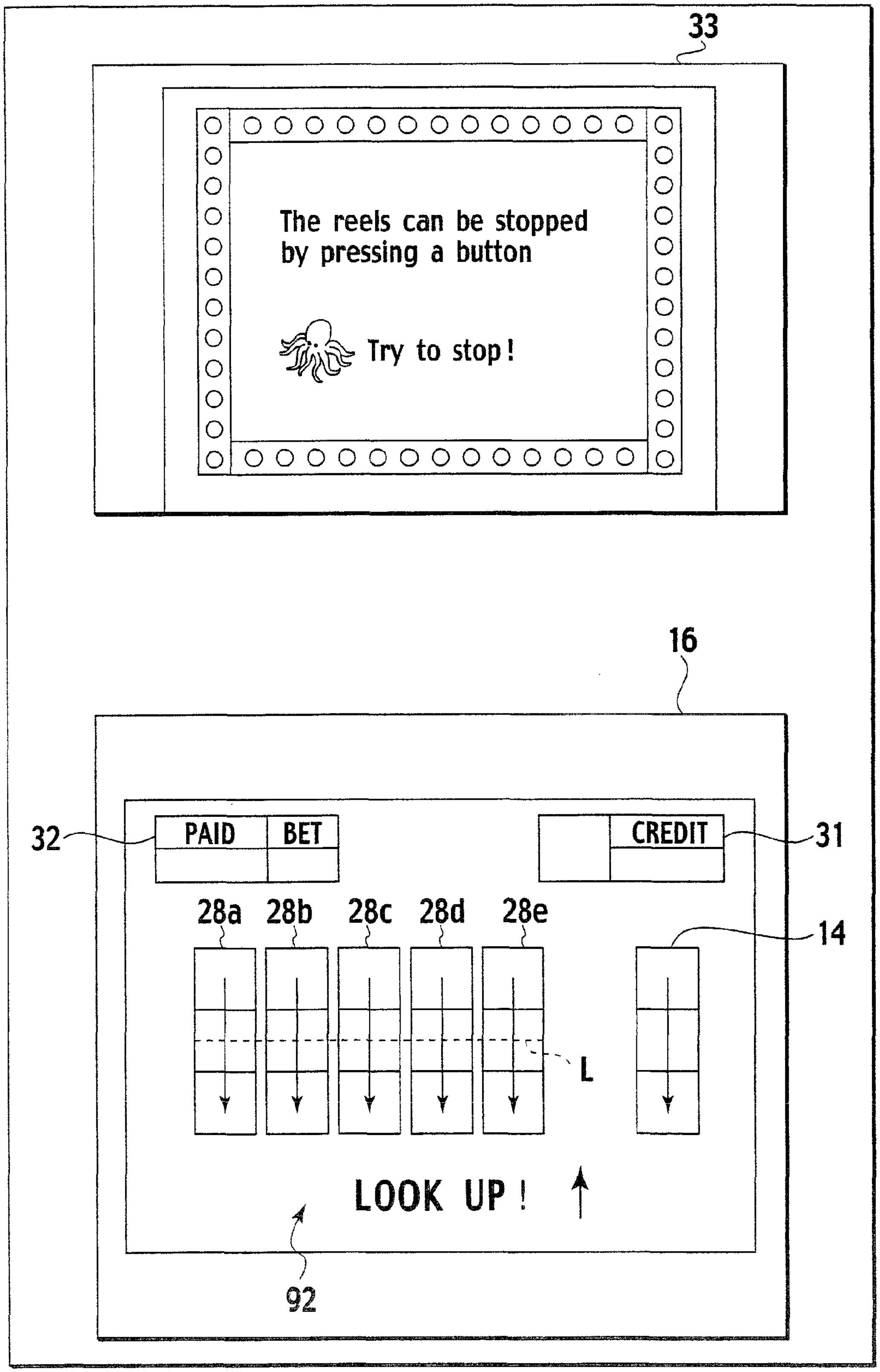
FIG. 20 is a diagram showing an exemplary display for notifying that the stop control game is played in a slot machine according to another embodiment of the present invention.

When the main CPU 41 sets the operation of the stop switch 82 active, the letters "The reel can be stopped by pressing a button!" are displayed on the upper side image display panel 33 of the slot machine 100 as shown in FIG. 20. In addition, at a lower portion of the lower side image display panel 16, an image 92 of an arrow pointing upwards and letters "LOOK UP!" is displayed, and the display lamp 83 attached to the stop switch 82 is turned on. In this way, it is possible to notify to the player that it becomes possible to stop the reel 14. It may also be made to notify this at the same time by the sound or the electric decoration.

Figure 21:
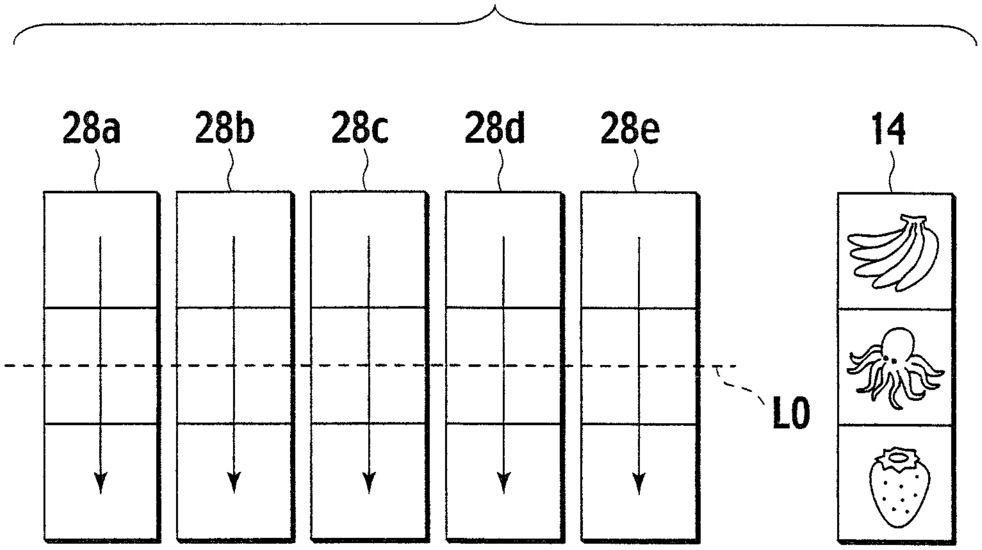
FIG. 21 is a diagram showing an exemplary display when a symbol of "OCTOPUS" is stopped by the execution of the stop control game in a slot machine according to another embodiment of the present invention.

Then, the main CPU 41 stops the symbols displayed on the reel 14 in relation to an input timing of the stop switch 82 by the player. At this point, if it is stopped at the prescribed symbol, such as a symbol "OCTOPUS" as shown in FIG. 21, for example, the stop control game for enabling the rearrangement regardless of the arrangement control will be executed.

The main CPU 41 proceeds with the game according to the game program and the game system program stored in the memory card 53. The game program contains the symbols to be stopped determination program, a program regarding the proceeding of the game, and a program for making a transition to the bonus game. Also, the game program contains image data and sound data to be outputted during the game. In addition, the game program contains a program for the processing to determine whether or not to execute the stop control game by rotating the reel 14 when a combination of prescribed symbols is realized in the display regions 28 (28*a* to 28*e*).

To the sub CPU 61, a motor driving circuit 62 for controlling the rotation of the reel 14 is connected. To the reel 14, a stepping motor 70 is connected, and the stepping motor 70 starts the rotation according to the driving signal outputted from the motor driving circuit 62, and in conjunction with that the reel 14 is rotated. Also, the sub CPU 61 carries out a control for accepting the operation input of the stop switch 82 and stopping the rotating reel 14 when it is detected that the stop switch 82 is operated by the player.

A controller 49 is formed by the mother board 40 and the gaming board 50 described above. The controller 48 executes the arrangement control in which a plurality of symbols arranged on the lower side image display panel 16 (first display) are scrolled, then symbols to be arranged into a symbol matrix are selected and determined from a plurality of types of symbols in order to rearrange them as a new symbol matrix, and the scrolling state is stopped at the determined symbols, and carries out a control for setting the stop switch 82 active so that it can be operated by the player and executing a game for scrolling a plurality of symbols and then stopping by starting the rotation of the mechanical reel 14 as the second display, only in the case where at least one predetermined symbol or a predetermined combination formed by one or more symbols among a plurality of symbols is determined, and executing a game that can be played by the player without betting for a prescribed number of times when a specific symbol is stopped in that game, Then, the controller 49 returns the credits stored in the RAM 43 to the slot machine itself when a specific combination of a plurality of symbols is stopped as the stop switch 82 is operated in a game that can be played by the player without betting, that is, the stop control game.

Figure 19:
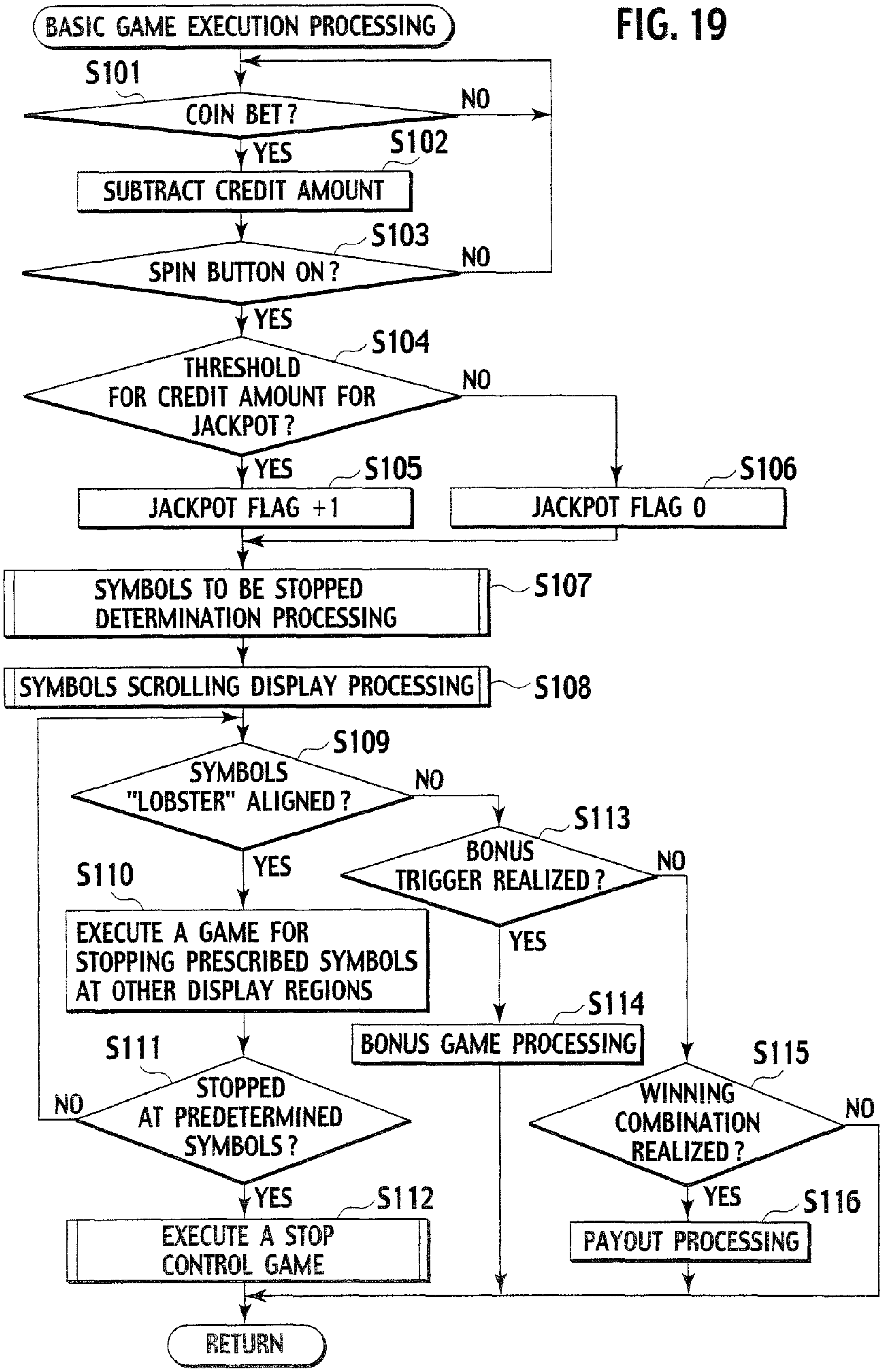
FIG. 19 is a flow chart showing a procedure of a base game processing to be executed by a slot machine according to another embodiment of the present invention.

More specifically, the base game to be executed by the main CPU 41 in the case of having the reel 14 will be described. FIG. 19 is a flow chart showing the concrete processing procedure of the base game.

In the base game execution processing, first, the main CPU 41 judges whether the coin BET has been made or not (step S101). In this processing, the main CPU 41 judges whether the input signal outputted from the 1-BET switch 26S when the 1-BET button 26 is pressed or the input signal outputted from the Max-BET switch 27S when the Max-BET button 27 is pressed has been received or not. When it is judged that the coin BET has not been made, the processing returns to the step S101.

On the other hand, at the step S101, when it is judged that the coin BET has been made, the main CPU 41 carries out the processing for subtracting the credit amount stored in the RAM 43 according to the number of coins to be bet (step S102). Note that when the number of coins to be bet is greater than the credit amount stored in the RAM 43, the processing is returned to the step S101, without carrying out the processing for subtracting the credit amount stored in the RAM 43. Note also that when the number of coins to be bet exceeds the upper limit value (50 in this embodiment) that can be bet per one game, the processing proceeds to the step S103, without carrying out the processing for subtracting the credit amount stored in the RAM 43. In this state, it becomes a state where it is possible to display symbols by the scrolling display in the display regions 28 (28*a* to 28*e*).

Next, the main CPU 41 judges whether the spin button 23 is turned ON or not (step S103). In this processing, the main CPU 41 judges whether the input signal outputted from the spin switch 23S when the spin button 23 is turned ON is received or not. When it is judged that the spin button 23 is not turned ON, the processing is returned to the step S101. Note that in the case where the spin button 23 is not turned ON (the case where a command indicating the finishing of the game is inputted without turning the spin button 23 ON, for example), the main CPU 41 cancels the subtraction result at the step S102.

In this embodiment, the exemplary case of carrying out the processing for subtracting the credit amount (step S102) after the coin BET is made (step S101), before making the judgement as to whether the spin button 23 is turned ON or not (step S103) will be described. However, the present invention is not limited to this exemplary case. For example, it is also possible to make the judgement as to whether the spin button 23 is turned ON or not (step S103) after the coin BET is made (step S101), and carry out the processing for subtracting the credit amount (step S102) when it is judged that the spin button 23 is turned ON (step S103 YES).

Then, at the step S104 of FIG. 19, when it is judged that the spin button 23 is turned ON, the main CPU 41 judges whether the amount of credits for jackpot payout is greater than or equal to the threshold or not. In the case where the amount of credits for jackpot payout is greater than or equal to the threshold, the jackpot flag indicating that the jackpot payout is possible is set to +1 at the step S105, and the symbols to be stopped determination processing is carried out. On the other hand, in the case where it is judged that the amount of credits for jackpot payout is less than the threshold at the step S104, the main CPU 41 does not erect the jackpot flag in the RAM 43 at the step S106, and carries out the symbols to be stopped determination processing.

In the symbols to be stopped determination processing of the step S107, the main CPU 41 determines symbols to be displayed through the display windows 15 at a time of stopping symbols in the display regions 28 (28*a* to 28*e*) by executing the symbols to be stopped determination program stored in the RAM 43. In this way, the combination of symbols to be stopped on the payline L is determined.

Next, the main CPU 41 carries out the symbols scrolling display processing (step S108). This processing is a processing for stopping symbols in the display regions 28 (28*a* to 28*e*) after the scrolling of symbols in the display regions 28 (28*a* to 28*e*) is started, such that symbols determined at the step S107 will be stopped on the payline L.

Next, the main CPU 41 judges whether a combination of symbols stopped at the payline L is a combination of symbols "LOBSTER" which is a prescribed combination or not (step S109). In the case where a combination of symbols "LOBSTER" is stopped on the payline L, the reel 14 which is another display region is rotated and the stop switch 82 is set active, and a game for stopping a predetermined symbol on the reel 14 is executed (step S110).

Then, at the step S111, the main CPU 41 judges whether the predetermined symbol (a symbol "OCTOPUS" shown in FIG. 21) is stopped or not (step S111), and in the case where the symbol "OCTOPUS" is stopped, the stop control game to be described below will be executed (step S112). In the case where the symbol stopped on the payline L is not the symbol "OCTOPUS", the processing is returned to the step S109.

On the other hand, in the case where a combination of symbols "LOBSTER" is not aligned on the payline L at the step S109, the main CPU 41 judges whether the bonus trigger is realized or not, that is, whether a combination of symbols "APPLE" is stopped on the payline L or not at the step S113, and when it is judged that the bonus trigger is realized, the main CPU 41 executes the bonus game processing to be described below (step S114).

Also, when it is judged that the bonus trigger is not realized, the main CPU 41 judges whether the winning combination is realized or not, that is, whether a combination of symbols "PLUM" is stopped or not, for example (step S115), and when it is judged that the winning combination is realized, the main CPU 41 carries out the payout processing corresponding to this winning combination (step S116). In the case of depositing a part of the credits to be paid, the main CPU 41 adds the prescribed amount of credit to the credit amount stored in the RAM 43.

Also, in the case of paying out the credits, the main CPU 41 makes the payout of a prescribed amount of credits by transmitting the control signal to the hopper 66. At this point, the coin detection unit 67 counts the number of coins paid from the hopper 66, and transmits a payout completion signal to the main CPU 41 when the count value reached the specified number. As a result, the main CPU 41 stops the driving of the hopper 66 and finishes the coin payout processing.

In the case where it is judged that the winning combination is not realized (step S115: NO), that is in the case of the lost game, the credits will not be paid out. In this way, the base game will be executed.

As described above, in this embodiment, the reel 14 as a dedicated display (second display) for scrolling at least one symbol for setting the stop switch 82 active is provided, and the stop control game can be started only in the case where the at least one symbol arranged on the reel 14 is determined as the prescribed symbol by the main CPU 41. Then, if the player succeeds in stopping symbols displayed by the scrolling display by pressing the stop switch 82 and a combination associated with a payout is realized, the corresponding payout is made. In particular, it is applicable to the jackpot payout in which a part of the credits to be paid to the player is accumulatively stored and the payout of the accumulatively stored credits is made when symbols are rearranged into a specific combination, so that it is possible to make the player to have a higher interest to the stop control game. A possibility for being capable of playing the stop control game becomes higher and further a possibility for realizing a combination of symbols associated with a higher payout in the stop control game becomes higher for the player who can operates the stop switch 82 at more appropriate timing, so that it is possible to increase the level of technicality required to the player in the game.

Two embodiments described above are directed to the case where the slot machine is the so called stand-alone type, but the slot machine according to the present invention can also be a slot machine corresponding to the progressive system in which a plurality of slot machines are connected with a management server. In this case, a part of credits paid to the player at each slot machine that constitutes the system will be stored at the management server, and a payout of credits is made from the management server to a slot machine that satisfied a prescribed condition.

Figure 22:
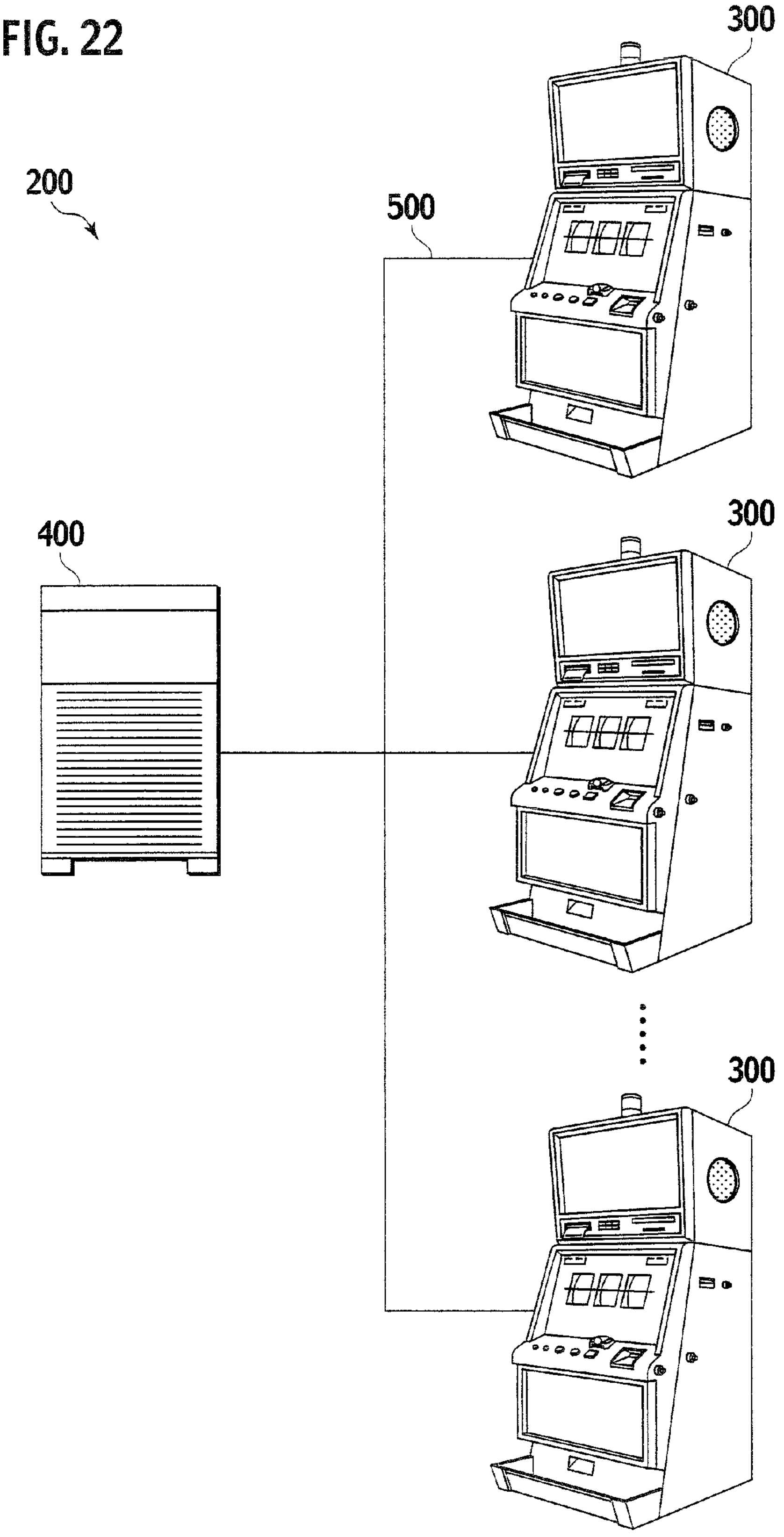
FIG. 22 is a diagram showing an overall configuration of a progressive system formed by a slot machine according to an embodiment of the present invention.
Figure 23:
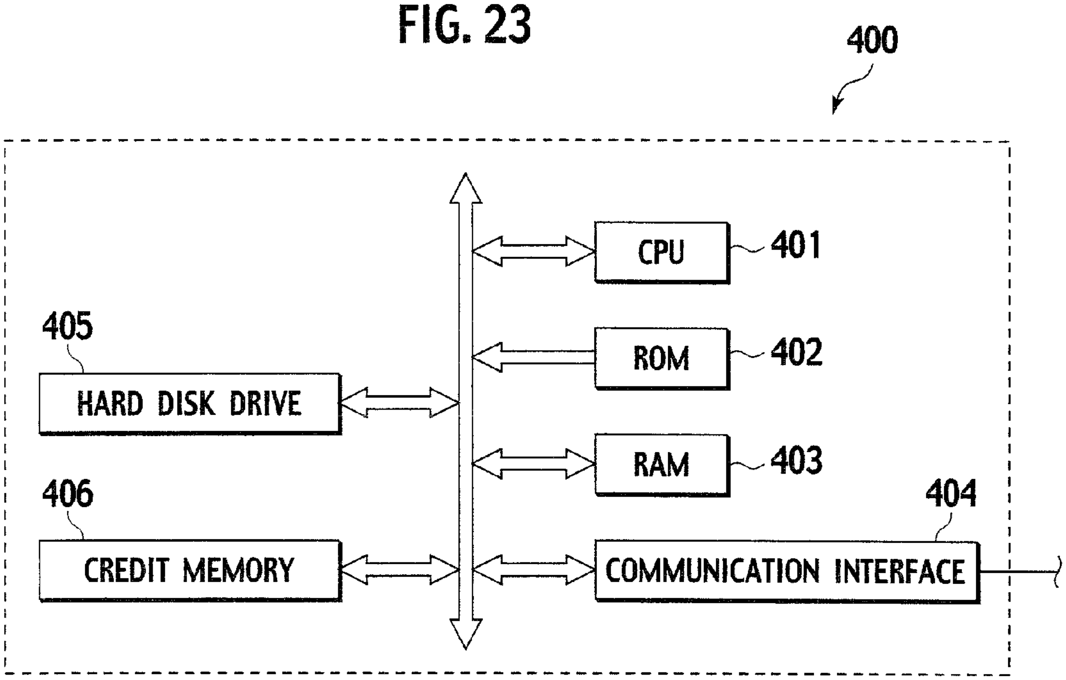
FIG. 23 is a diagram showing a configuration of a management server in a progressive system according to an embodiment of the present invention.

In the following, the progressive system and the slot machine corresponding to that system will be described in detail with references to the drawings. FIG. 22 is a diagram showing an overall configuration of the gaming system according to one embodiment of the present invention. A slot machine system 200 comprises a plurality of slot machines 300 and a management server 400 for carrying out the overall control of the system, which are connected through a prescribed communication channel 500. Such a slot machine system 200 may be constructed within a single gaming facility in which various games can be played such as a bar or a casino, or among a plurality of gaming facilities. Also, in the case where it is constructed within a single gaming facility, the slot machine system 200 may be constructed at each floor or section of that gaming facility. The communication channel 500 is not particularly limited and can be wired one or wireless one, and a dedicated channel or a switched channel can be adopted.

For the slot machines 300 that constitute the slot machine system 200, the slot machine 10 shown in FIG. 6 or the slot machine 100 shown in FIG. 18 can be utilized. Note however that, in that case, the communication channel connected to the communication interface 44 will correspond to the communication channel 500 in FIG. 22. Each slot machine 300 is connected to the management server 400 as a host computer through the communication channel 500, and a part of credits paid to the player at each slot machine 300 is stored at the management server 400, and a payout of credits is made from the management server 400 to a slot machine that satisfied a prescribed condition.

This condition can be when the credits stored inside the management server 400 reaches a prescribed threshold and a combination of jackpot symbols is stopped and displayed in a game (stop control game) that can be played by the player without betting. At this point, the controller 49 receives the credits stored in a memory of the externally located management server 400. In this embodiment, this payout will be referred to as the jackpot payout.

The management server 400 has a CPU 401 as a calculation processing device, a ROM (Read Only Memory) 402, a RAM (Random Access Memory) 403 as a working area of the CPU 401, and a communication interface 404, which are mutually connected by an internal bus. The internal bus is a PCI bus, which carries out the signal transmission between constituent elements while also supplying the electric power. Also, the management server 400 has a hard disk drive 405 as a memory medium. Also, the management server 400 has a credit memory 406 for storing the amount of credits entered and the amount paid out which are received from the slot machine 300 through the communication interface 404, in correspondence with an identification number.

Note that, for the credit memory 406, it is possible to use a known rewritable memory such as EPROM (Erasable Programmable Read Only Memory), EEPROM (Electronically Erasable and Programmable Read Only Memory), etc., and it is also possible to use a part of a memory region of the hard disk drive 405 which is separated either physically or logically as the credit memory.

The communication interface 404 is connected with the communication interface 404 of each slot machine 300 that is similarly provided through the communication channel 500.

When a part of credits to be paid to the player, the amount of credits entered, the amount paid out, and the identification number are received from the slot machine 300 through the communication interface 404, the CPU 401 stores them accumulatively in the credit memory 406, and updates a game log corresponding to that identification number stored into the credit memory 406. More specifically, the number of games played is incremented by one, the amount entered is added to the accumulated amount entered, and the amount paid out is added to the accumulated amount paid out. In addition, the income and outgo of coins and a return rate are calculated and updated according to the accumulated amount entered and the accumulated amount paid out. Then, in the case where it is judged that the number of games played after the updating has reached a setting value, and in the case where the credits have reached a prescribed threshold and symbols are rearranged in a specific combination by an external control at the slot machine 300, the CPU 401 transmits a returning command signal for paying the credits stored in the credit memory 406 (that is, making the jackpot payout), to the slot machine 300 which satisfies that condition. The management server 400 has a function of the so called hall server which is to be located in the gaming facility that has a plurality of slot machines 300, a function of a server for collectively managing a plurality of gaming facilities, etc.

The ROM 402 stores the system program, the permanent data, etc., for controlling the operation of the management server 400. Also, the RAM 403 temporarily stores data received from each slot machine 300 and data of the calculation results, etc. The hard disk drive 405 stores the game log at that slot machine 300, etc., in correspondence to the identification number of each slot machine 300.

Note that each slot machine 300 is assigned with a unique identification number, and the management server 400 judges the source of data sent from each slot machine 300 according to that identification number. Also, in the case of transmitting data from the management server 400 to the slot machine 300, the destination is specified by using the identification number. The identification number of the slot machine 300 is not particularly limited as long as it can uniquely identify the slot machine, and can be given by letters, symbols, numbers or their combinations, for example.

In the case of using slot machines having a configuration shown in FIG. 6 or FIG. 18 as the slot machines 300, the main CPU 41 of each slot machine 300 transmits the amount of credits entered and the amount paid out in the game along with the identification number of the slot machine 300 to the management server 400 each time one game is played.

When a part of credits to be paid to the player, the amount of credits entered, the amount paid out, and the identification number are received from the slot machine 300 through the communication interface 404, the CPU 401 of the management server 400 stores them accumulatively in the credit memory 406, and updates a game log corresponding to that identification number stored into the credit memory 406.

At the management server 400, the number of games played, the accumulated amount entered, and the accumulated amount paid out are stored in correspondence to the identification number of each slot machine 300. At the management server 400, a setting value to be compared with the number of games played is set in correspondence to each identification number, and in the case where it is judged that the number of games played at some slot machine 300 has reached the setting value that is set for each slot machine 300 and the amount of credits in the credit memory inside the management server 400 has become greater than or equal to a threshold, a returning command signal is transmitted from the management server 400. When the returning command signal is received through the communication interface 44, the main CPU 41 of the slot machine 300 sets a jackpot flag.

More specifically, the CPU 401 increments the number of games played by one, adds the amount entered to the accumulated amount entered, and adds the amount paid out to the accumulated amount paid out, which are stored in the credit memory 406. In addition, the CPU 401 calculates and updates the income and outgo of coins and a return rate according to the accumulated amount entered and the accumulated amount paid out.

Then, in the case where it is judged that the number of games played after the updating has reached a setting value, and in the case where the credits have reached a prescribed threshold and symbols are rearranged in a specific combination by an external control at the slot machine 300, the CPU 401 transmits a returning command signal for paying the credits stored in the credit memory 406 (that is, making the jackpot payout), to the slot machine 300 which satisfies that condition.

As described above, in the slot machine 300, the CPU 401 can store a part of credits to be paid to the player accumulatively in the credit memory 406 of the management server 400 that is located external of that slot machine, so that when the credits have reached a prescribed threshold and symbols are rearranged in a specific combination by an external control at the slot machine 300, the CPU 401 can return the credits stored in the credit memory 406 to the corresponding slot machine 300.

Consequently, in the slot machine system 200 according to one embodiment of the present invention, the stop control game can be started only in the case where a combination of symbols for setting the stop switch 82 active is determined as the prescribed combination. Then, if the player succeeds in stopping symbols displayed by the scrolling display by pressing the stop switch 82 and a combination associated with a payout is realized, the corresponding payout is made. In particular, it is applicable to the jackpot payout in which a part of the credits to be paid to the player is accumulatively stored in the credit memory 406 of the management server 400 and the payout of the accumulatively stored credits in the credit memory 406 is made when symbols are rearranged into a specific combination, so that it is possible to make the player to have a higher interest to the stop control game. A possibility for being capable of playing the stop control game becomes higher and further a possibility for realizing a combination of symbols associated with a higher payout in the stop control game becomes higher for the player who can operates the stop switch 82 at more appropriate timing, so that it is possible to increase the level of technicality required to the player in the game.

In the above, the embodiments of the slot machine according to the present invention have been described, but they are only showing concrete examples, they are not intended to limit the present invention particularly, and the concrete configuration of each means or the like can be appropriately changed by design. Also, the effects described in the embodiments of the present invention are only listing the most preferable effects arising from the present invention, and the effects of the present invention are not limited to those described in the embodiments of the present invention.

What is claimed is:

1. A slot machine, comprising:

a display device configured to present a plurality of symbols with the symbols arranged in a plurality of rows and columns;

a controller that controls gaming operation of the gaming machine; and a selectively active stop control button;

wherein the controller is configured to control the presentation of the symbols such that the symbols in each of the rows or in each of the columns move or simulate moving in a scrolling manner or otherwise change;

wherein during the execution of base games, the stop control button is inactive and the controller is configured to control stoppage of the movement or simulated movement or other changing of the symbols solely in accordance with a controller-implemented process that determines the outcome of a given base game;

wherein during the execution of stop control games, the stop control button is active to permit a player to effect stoppage of the movement or simulated movement or other changing of the symbols so as to determine an outcome of a given stop control game;

wherein the controller is configured to control gaming operation of the gaming machine such that whether a stop control game is executed depends on the outcome of at least one base game; and wherein the controller is configured to control the gaming operation of the gaming machine such that the symbols stop their movement or simulated movement or other changing during execution of a stop control game without player input and always in a non-winning arrangement if the player does not operate the stop control button within a predetermined period of time.

2. The slot machine of claim 1, wherein the controller is configured to control the gaming operation of the gaming machine such that the movement or simulated movement or other changing of the symbols begins automatically when a given stop control game is executed.

3. The slot machine of claim 1, wherein the controller is configured to control the gaming operation of the gaming machine such that the movement or simulated movement or other changing of the symbols during execution of a stop control game requires a player action in order to begin.

4. The slot machine of claim 1, wherein the controller is configured to control the gaming operation of the gaming machine such that a payout table that is applicable during execution of a stop control game is different from a payout table that is applicable during execution of a base game.

5. The slot machine of claim 1, wherein the controller is configured to control the gaming operation of the gaming machine such that during the execution of stop control games, the player is able to effect stoppage of the movement or simulated movement or other changing of the symbols in multiple rows or columns.

6. The slot machine of claim 5, wherein the controller is configured to control the gaming operation of the gaming machine such that after the player has caused a first row or column of symbols to stop their movement or simulated movement or other changing, all other rows or columns of symbols except for one last row or column automatically stop their movement or simulated movement or other changing, and the player causes said one last row or column to stop its movement or simulated movement or other changing by operating the stop control button.

7. The slot machine of claim 1, wherein a bonus game is a possible outcome of a base game, said bonus game being a game that is potentially more advantageous to the player than a base game is.

8. The slot machine of claim 1, wherein higher payouts are possible during stop control games than in base games.

9. The slot machine of claim 1, wherein the controller is configured to control the gaming operation of the gaming machine such that a triggering event must be achieved during play of a base game before a stop control game can be executed.

10. The slot machine of claim 1, wherein the triggering event comprises a predefined outcome of a base game.

11. The slot machine of claim 10, wherein the predefined outcome of a base game comprises a predefined combination of symbols appearing statically on a pay line.

12. The slot machine of claim 9, further comprising a secondary display device configured to present a secondary plurality of symbols;

wherein the controller is configured to control the presentation of the secondary symbols such that upon occurrence of the triggering event, the secondary symbols move or simulate moving in a scrolling manner or otherwise change;

wherein the controller is configured to control the gaming operation of the gaming machine such that upon occurrence of the triggering event, the stop control button becomes active to permit the player to effect stoppage of the movement or simulated movement or other changing of the secondary symbols; and wherein the controller is configured to control the gaming operation of the gaming machine such that a predefined result must be achieved upon stopping the movement or simulated movement or other changing of the secondary symbols in order for a stop control game to be executed.

13. The slot machine of claim 1, wherein the controller is configured to control gaming operation of the gaming machine such that an indication is provided when the stop control button is active.

14. The slot machine of claim 13, wherein the controller is configured to control gaming operation of the gaming machine such that the stop control button is illuminated when it becomes active.

15. The slot machine of claim 13, further comprising one or more video graphic display panels, wherein the controller is configured to control gaming operation of the gaming machine such when the stop control button is active, an indicator is displayed on said one or more video graphic display panels indicating that the stop control button is active.

16. The slot machine of claim 1, wherein said stop control games are free games that do not require a gaming amount to be bet.

17. The slot machine of claim 1, wherein the plurality of symbols are presented videographically.

18. The slot machine of claim 1, wherein the plurality of symbols are presented on a plurality of reels.

19. The slot machine of claim 1, wherein the stop control button is a mechanical button.

20. The slot machine of claim 1, wherein the stop control button is displayed video graphically on a touch-sensitive screen.

21. The slot machine of claim 1, wherein the controller is configured to control gaming operation of the gaming machine such that multiple paylines can be activated.

* * * * *